(12) United States Patent
Ernstrom et al.

(10) Patent No.: US 9,264,302 B2
(45) Date of Patent: Feb. 16, 2016

(54) METHODS AND SYSTEMS WITH ENHANCED ROBUSTNESS FOR MULTI-CHASSIS LINK AGGREGATION GROUP

(71) Applicant: Telefonaktiebolaget L M Ericsson (publ), Stockholm (SE)

(72) Inventors: Lars Ernstrom, Palo Alto, CA (US); Allwyn Carvalho, Alameda, CA (US); Veeranjaneyulu Gorla, Santa Clara, CA (US); Anjing Wang, San Jose, CA (US); Kiran Sasidharan Pillai, San Jose, CA (US); Chezhian Renganathan, San Jose, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 95 days.

(21) Appl. No.: 13/919,788

(22) Filed: Jun. 17, 2013

(65) Prior Publication Data
US 2014/0369186 A1 Dec. 18, 2014

(51) Int. Cl.
*H04L 12/24* (2006.01)
*H04L 12/713* (2013.01)
*H04L 12/939* (2013.01)

(52) U.S. Cl.
CPC .......... *H04L 41/0668* (2013.01); *H04L 45/586* (2013.01); *H04L 49/55* (2013.01)

(58) Field of Classification Search
CPC .................................................. H04L 41/0668
USPC ............ 370/225, 236, 389, 219, 216, 395.53, 370/242, 390, 230, 221
See application file for complete search history.

(56) References Cited

U.S. PATENT DOCUMENTS 7,969,898 B1 * 6/2011 Raj et al. ........................ 370/248
8,327,023 B2 * 12/2012 Zhao ............................ 709/245
(Continued)

FOREIGN PATENT DOCUMENTS

EP 2533474 A1 12/2012

OTHER PUBLICATIONS

Bocci, et al., "Network High Availability for Ethernet Services Using IP/MPLS Networks", IEEE Communications Magazine, vol. 45, No. 3, Mar. 1, 2008, pp. 90-96.
(Continued)

*Primary Examiner* — Parth Patel
(74) *Attorney, Agent, or Firm* — Nicholson De Vos Webster & Elliott LLP

(57) ABSTRACT

A method implemented for a link aggregation group is disclosed. The link aggregation group contains a local interface and a remote interface. The local interface is a logical interface formed by a plurality of network elements including a local network element and a peer network element. The local network element communicates with the peer network element through an inter-peer link. The method starts with determining that the local network element is active by checking that an aggregate state of the links coupled to the local network element is active. The method continues with detecting an anomaly of the active links and sending a notification to the peer network element about the anomaly. Then method continues with receiving an activation confirmation that the peer network element is ready for switching and switching traffic from the active links to the inter-peer link in response to receiving the activation confirmation.

38 Claims, 15 Drawing Sheets

(56) References Cited

U.S. PATENT DOCUMENTS

| | | | | |
|---|---|---|---|---|
| 8,565,085 | B2* | 10/2013 | Kotrla et al. | 370/232 |
| 8,724,456 | B1* | 5/2014 | Hong et al. | 370/225 |
| 8,774,179 | B1* | 7/2014 | Gaggara et al. | 370/389 |
| 8,780,699 | B1* | 7/2014 | Hasan | 370/219 |
| 8,787,149 | B1* | 7/2014 | Ramanathan et al. | 370/216 |
| 8,792,501 | B1* | 7/2014 | Rustagi et al. | 370/395.53 |
| 8,861,340 | B1* | 10/2014 | Atlas | 370/225 |
| 2008/0089235 | A1* | 4/2008 | Kotrla et al. | 370/242 |
| 2008/0089236 | A1* | 4/2008 | Kotrla et al. | 370/242 |
| 2008/0181233 | A1* | 7/2008 | Washam et al. | 370/395.5 |
| 2009/0225752 | A1* | 9/2009 | Mitsumori | 370/390 |
| 2010/0146323 | A1* | 6/2010 | Hu | 714/2 |
| 2010/0265831 | A1* | 10/2010 | Hachiya et al. | 370/248 |
| 2010/0329111 | A1* | 12/2010 | Wan et al. | 370/218 |
| 2011/0090789 | A1* | 4/2011 | Fung | 370/230 |
| 2011/0103246 | A1* | 5/2011 | Byun | 370/252 |
| 2011/0158113 | A1* | 6/2011 | Nanda et al. | 370/252 |
| 2012/0033549 | A1* | 2/2012 | Joshi et al. | 370/228 |
| 2012/0113835 | A1* | 5/2012 | Alon et al. | 370/252 |
| 2012/0127855 | A1* | 5/2012 | Alon et al. | 370/218 |
| 2012/0275297 | A1 | 11/2012 | Subramanian | |
| 2013/0246652 | A1* | 9/2013 | Liu et al. | 709/238 |
| 2013/0258839 | A1* | 10/2013 | Wang et al. | 370/221 |
| 2013/0301407 | A1* | 11/2013 | Zhou et al. | 370/230 |
| 2013/0315097 | A1* | 11/2013 | Yang et al. | 370/254 |
| 2014/0092901 | A1* | 4/2014 | Kapadia et al. | 370/390 |
| 2014/0195694 | A1* | 7/2014 | Sait et al. | 709/239 |
| 2014/0204761 | A1* | 7/2014 | Durrani et al. | 370/236 |

OTHER PUBLICATIONS

Lapuh, et al., "Split Multi-link Trunking (SMLT) draft-lapuh-network-smlt-08", Network Working Group, The IETF Trust, No. 8, Jul. 7, 2008, 15 pages.

Atlas, A., et al., "An Architecture for IP/LDP Fast-Reroute Using Maximally Redundant Trees", draft-atlas-rtgwg-mrt-frr-architecture-01, Oct. 31, 2011, 26 pages, Routing Area Working Group.

Atlas, A., et al., "Basic Specification for IP Fast Reroute: Loop-Free Alternates", Sep. 2008; 32 pages, Network Working Group, RFC 5286.

Bryant, S., et al., "Remote LFA FRR draft-shand-remote-lfa-00", Oct. 11, 2011; 13 pages, Network Working Group.

Filsfils, C., et al., "Loop-Free Alternate (LFA) Applicability in Service Provider (SP) Networks", Jun. 2012; 35 pages, Internet Engineering Task Force (IETF), RFC 6571.

J. Postel, "User Datagram Protocol," Aug. 28, 1980, 3 pages, RFC: 768.

"Transmission Control Protocol, DARPA Internet Program Protocol Specification," Sep. 1981, 91 pages, RFC: 793, Information Sciences Institute, University of Southern California, Marina del Rey, California.

C. Hedrick, "Routing Information Protocol," Jun. 1988, 33 pages, Network Working Group, Request for Comments: 1058.

David Oran, "OSI IS-IS Intra-domain Routing Protocol," Feb. 1990, 157 pages, Network Working Group, Request for Comments: 1142.

T. Socolofsky, et al., "A TCP/IP Tutorial," Jan. 1991, 28 pages, Network Working Group, Request for Comments: 1180.

G. Malkin, et al., "RIPng for IPv6," Jan. 1997, 19 pages, Network Working Group, Request for Comments: 2080.

R. Braden, et al., "Resource ReSerVation Protocol (RSVP)—Version 1 Functional Specification," Sep. 1997, 112 pages, Network Working Group, Request for Comments: 2205.

J. Wroclawski, "The Use of RSVP with IETF Integrated Services," Sep. 1997, 33 pages, Network Working Group, Request for Comments: 2210.

J. Wroclawski, "Specification of the Controlled-Load Network Element Service," Sep. 1997, 19 pages, Network Working Group, Request for Comments: 2211.

S. Shenker, et al., "Specification of Guaranteed Quality of Service," Sep. 1997, 20 pages, Network Working Group, Request for Comments: 2212.

J. Moy, "OSPF Version 2," Apr. 1998, 244 pages, Network Working Group, Request for Comments: 2328, The Internet Society.

G. Malkin, "RIP Version 2," Nov. 1998, 39 pages, Network Working Group, Request for Comments: 2453, The Internet Society.

S. Deering, et al., "Internet Protocol, Version 6 (IPv6) Specification," Dec. 1998, 39 pages, Network Working Group, Request for Comments: 2460, The Internet Society.

K. Nichols, et al., "Definition of the Differentiated Services Field (DS Field) in the IPv4 and IPv6 Headers," Dec. 1998, 20 pages, Network Working Group, Request for Comments: 2474, The Internet Society.

S. Blake, et al., "An Architecture for Differentiated Services," Dec. 1998, 36 pages, Network Working Group, Request for Comments: 2475, The Internet Society.

J. Heinanen, et al., "Assured Forwarding PHB Group," Jun. 1999, 11 pages, Network Working Group, Request for Comments: 2597, The Internet Society.

D. Borman, et al., "IPv6 Jumbograms," Aug. 1999, 9 pages, Network Working Group, Request for Comments: 2675, The Internet Society.

D. Black, "Differentiated Services and Tunnels," Oct. 2000, 14 pages, Network Working Group, Request for Comments: 2983, The Internet Society.

K. Nichols, et al., "Definition of Differentiated Services Per Domain Behaviors and Rules for their Specification," Apr. 2001, 24 pages, Network Working Group, Request for Comments: 3086, The Internet Society.

D. Black, et al., "Per Hop Behavior Identification Codes," Jun. 2001, 8 pages, Network Working Group, Request for Comments: 3140, The Internet Society.

D. Awduche, et al., "RSVP-TE: Extensions to RSVP for LSP Tunnels," Dec. 2001, 61 Pages, Network Working Group, Request for Comments: 3209, The Internet Society.

B. Davie, et al., "An Expedited Forwarding PHB (Per-Hop Behavior)," Mar. 2002, 16 pages, Network Working Group, Request for Comments: 3246, The Internet Society.

A. Charny, et al., "Supplemental Information for the New Definition of the EF PHB (Expedited Forwarding Per-Hop Behavior)," Mar. 2002, 24 pages, Network Working Group, Request for Comments: 3247, The Internet Society.

D. Grossman, "New Terminology and Clarifications for Diffserv," Apr. 2002, 10 pages, Network Working Group, Request for Comments: 3260, The Internet Society.

F. Baker, et al., "Management Information Base for the Differentiated Services Architecture," May 2002, 116 pages, Network Working Group, Request for Comments: 3289, The Internet Society.

Y. Bernet, et al., "An Informal Management Model for Diffserv Routers," May 2002, 56 pages, Network Working Group, Request for Comments: 3290, The Internet Society.

K. Chan, et al., "Differentiated Services Quality of Service Policy Information Base," Mar. 2003, 96 pages, Network Working Group, Request for Comments: 3317, The Internet Society.

L. Berger, "Generalized Multi-Protocol Label Switching (GMPLS) Signaling Resource ReserVation Protocol-Traffic Engineering (RSVP-TE) Extensions," Jan. 2003, 42 pages, Network Working Group, Request for Comments: 3473, The Internet Society.

K. Kompella, et al., "Procedures for Modifying the Resource reSerVation Protocol (RSVP)," Oct. 2004, 7 pages, Network Working Group, Request for Comments: 3936, The Internet Society.

B. Fenner, et al., "Management Information Base for the User Datagram Protocol (UDP)," Jun. 2005, 19 pages, Network Working Group, Request for Comments: 4113, The Internet Society.

Y. Rekhter, et al., "A Border Gateway Protocol 4 (BGP-4)," Jan. 2006, 104 pages, Network Working Group, Request for Comments: 4271, The Internet Society.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

J. Polk, et al., "A Resource Reservation Protocol (RSVP) Extension for the Reduction of Bandwidth of a Reservation Flow," May 2006,

(56) References Cited

OTHER PUBLICATIONS 21 pages, Network Working Group, Request for Comments: 4495, The Internet Society.

Z. Ali, et al., "Node-ID Based Resource Reservation Protocol (RSVP) Hello: A Clarification Statement," Jun. 2006, 7 pages, Network Working Group, Request for Comments: 4558, The Internet Society.

J. Babiarz, et al., "Configuration Guidelines for DiffServ Service Classes," Aug. 2006, 57 pages, Network Working Group, Request for Comments: 4594, The Internet Society.

K. Kompella, et al., "Virtual Private LAN Service (VPLS) Using BGP for Auto-Discovery and Signaling," Jan. 2007, 28 pages, Network Working Group, Request for Comments: 4761, The IETF Trust.

M. Lasserre, et al., "Virtual Private LAN Service (VPLS) Using Label Distribution Protocol (LDP) Signaling," Jan. 2007, 31 pages, Network Working Group, Request for Comments: 4762, The IETF Trust.

L. Andersson, et al., "LDP Specification," Oct. 2007, 135 pages, Network Working Group, Request for Comments: 5036, The IETF Trust.

R. Coltun, et al., "OSPF for IPv6," Jul. 2008, 94 pages, Network Working Group, Request for Comments: 5340, The IETF Trust.

L. Eggert, et al., "Unicast UDP Usage Guidelines for Application Designers," Nov. 2008, 27 pages, Network Working Group, Request for Comments: 5405, IETF Trust and the persons identified as the document authors.

F. Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.

* cited by examiner

C1 Updated Routing Table 902

| Route Type | Subnet Prefix | Primary next-hop | Backup next-hop |
|---|---|---|---|
| Interface | 1.1.1.0/24 | 1.1.1.1 | C2 |
| ARP | 1.1.1.2 | 1.1.1.2 | C2 |

FIG. 9A

C2 Updated Routing Table 904

| Route Type | Subnet Prefix | Primary next-hop | Backup next-hop |
|---|---|---|---|
| Interface | 1.1.1.0/24 | C1 | 1.1.1.1 |
| ARP | 1.1.1.2 | C1 | 1.1.1.1 |

FIG. 9B

METHODS AND SYSTEMS WITH ENHANCED ROBUSTNESS FOR MULTI-CHASSIS LINK AGGREGATION GROUP

FIELD

The embodiments of the present invention generally relate to link aggregation, and more particularly relate to methods and systems with enhanced robustness for multi-chassis Link Aggregation Group (MC-LAG).

BACKGROUND

Improvements in communication networks are made to provide higher transportation capacity and robustness. In modern networks, often there are multiple paths across network elements which can be used to increase bandwidth and overcome link and node failures. Robustness includes using network capacity optimally, rerouting around failure quickly, and providing transparency to affected network elements when rerouting changes are made. Various approaches in this regard involve the use of link aggregation.

Link aggregation refers to a process for operating a group of physical links as if they are a single link. FIG. 1A illustrates link aggregation as a network configuration and process used to aggregate multiple links. The link aggregation runs between a pair of network elements 120 and 122 in the network to enable transmission of user traffic on each of the links participating in Link Aggregation Group (LAG) 101. Aggregating multiple network connections in this fashion can increase throughput beyond what a single connection can sustain, and/or can be used to provide resiliency in case of a failure of one of the links. Basic link aggregation between two network elements has been standardized; see, e.g., Institute of Electrical and Electronics Engineers (IEEE) standard 802.1AX). Yet link aggregation is not limited to two network elements. For example, the Distributed Resilient Network Interconnect (DRNI) (see Clause 8 of IEEE 802.1AX-REV/ D1.0) specifies extensions to link aggregation in order to be able to use link aggregation on a network interface even between more than two network elements.

Another extension of the basic link aggregation concept illustrated in FIG. 1A is multi-chassis link aggregation group (MC-LAG). An MC-LAG provides readily identifiable and reliable link aggregation across multiple separate network elements. FIG. 1B illustrates link aggregation over multiple chassis. Local network element 132 (referred to as C1) and peer network element 134 (referred to as C2) form a logical interface of MC-LAG 160. The other end of MC-LAG 160 is remote network element 151 (referred to as RC). For the view of remote network element 151 and other network elements within network 150, local network element 132 and peer network element 134 act as a single network element. C1 and C2 are coupled with each other through inter-peer link 138. Inter-peer link 180 contains a set of links and it serves as a conduit between C1 and C2 for exchanging control messages. In addition, it may contain enough bandwidth for traffic rerouting upon MC-LAG failure conditions. Note while FIG. 1B illustrates two network elements, C1 and C2 forming the logical interface of an MC-LAG, some MC-LAG contains more network elements for one logical interface. In other words, there may exist multiple peer network elements for one local network element in some MC-LAG.

MC-LAG may provide redundancy in a multi-chassis environment. When redundancy is provided, MC-LAG needs a graceful and speedy recovery mechanism upon link or network element failure. In addition, MC-LAG needs a robust mechanism to route traffic through the multi-chassis environment.

SUMMARY

A method implemented for a link aggregation group is disclosed. The link aggregation group contains a local interface and a remote interface. The local interface is a logical interface formed by a plurality of network elements, and it includes a local network element and a peer network element. The remote interface is at a remote network element coupled to the link aggregation group through links of the link aggregation group. The local network element communicates with the peer network element through an inter-peer link. The method is implemented at the local network element, and it starts with determining that the local network element is active by checking that an aggregate state of the links coupled to the local network element is active, where the aggregate state of the links being active indicates that a number of the links are up and transmitting traffic of the link aggregation group. The method continues with detecting an anomaly of the active links of the link aggregation group and sending a notification to the peer network element about the anomaly. Then method continues with receiving an activation confirmation that the peer network element is ready for switching and switching traffic of the link aggregation group from the active links to the inter-peer link in response to receiving the activation confirmation. When the activation confirmation is not received, traffic will not be switched to the peer network element.

A method implemented for a link aggregation group is disclosed. The link aggregation group contains a local interface and a remote interface. The local interface is a logical interface formed by a plurality of network elements, and it includes a local network element and a peer network element. The remote interface is at a remote network element coupled to the link aggregation group through links of the link aggregation group. The local network element communicates with the peer network element through an inter-peer link. The method is implemented at the local network element, and it starts with determining that the local network element is active or standby by checking that an aggregate state of the links coupled to the local network element is active or standby, where the aggregate state of the links being active indicates that a number of the links are up and transmitting traffic of the link aggregation group, and the aggregate state of the links being standby indicates that a number of the links are up but not transmitting traffic of the link aggregation group. Upon the local network element being active, the method continues with setting a primary next-hop interface address of the local network element to be an IP address belonging to a subnet of the link aggregation group and setting a backup next-hop interface address of the local network element to be an IP address of the peer network element, where the primary and backup next-hop interface addresses are used for resolving addresses for routing traffic. Upon the local network element being standby, the method continues with setting the primary next-hop interface address of the local network element to be IP address of the peer network element, and setting the backup next-hop interface address of the local network element to be the IP address belonging to the subnet of the link aggregation group.

A network element communicatively coupled with aggregation ports through links of a link aggregation group is disclosed. The link aggregation group contains a local interface and a remote interface. The local interface is a logical interface formed by a plurality of network elements, and the logical interface includes the network element and a peer network element. The remote interface is at a remote network element coupled to the link aggregation group through links of the link aggregation group, and the network element communicates with the peer network element through an inter-peer link. The network element contains an aggregation interface configured to interact with links of the link aggregation group and detect anomalies of the links. The network element also contains a link aggregation group processor. The link aggregation group processor includes a link state checker configured to determine that the network element is active by checking that an aggregate state of the links coupled to the network element is active, where the aggregate state of the links being active indicates that a number of the links are up and transmitting traffic of the link aggregation group. The link aggregation group processor further includes an event handler configured to send a notification to the peer network element when an anomaly is detected at the aggregation interface. The event handler is further configured to receive an activation confirmation that the peer network element is ready for switching and to switch traffic of the link aggregation group from the active links to the inter-peer link in response to receiving the activation confirmation.

A network element communicatively coupled with aggregation ports through links of a link aggregation group is disclosed. The link aggregation group contains a local interface and a remote interface. The local interface is a logical interface formed by a plurality of network elements, and the logical interface includes the network element and a peer network element. The remote interface is at a remote network element coupled to the link aggregation group through links of the link aggregation group, and the network element communicates with the peer network element through an inter-peer link. The network element contains a storage device configured to store a forwarding information base (FIB), where the FIB contains forwarding information to aid the network element to forward traffic. The network element also contains a link aggregation group processor. The link aggregation group processor includes a link state checker configured to determine that the network element is active or standby by checking that an aggregate state of the links coupled to the network element is active or standby. The aggregate state of the links being active indicates that a number of the links are up and transmitting traffic of the link aggregation group, and the aggregate state of the links being standby indicates that a number of the links are up but not transmitting traffic of the link aggregation group. The link aggregation group processor further includes a route controller configured to set a primary next-hop interface address of the network element to be an IP address of the remote interface of the link aggregation group and to set a backup next-hop interface address of the network element to be an IP address of the peer network element in the FIB upon the link state checker determines the network element being active. Upon the link state checker determines the network element being standby, the route controller is configured to set the primary next-hop interface address of the network element to be IP address of the peer network element and set the backup next-hop interface address of the network element to be an IP address of the remote interface of the link aggregation group in the FIB upon the link state checker determines that the network element being standby.

BRIEF DESCRIPTION OF THE DRAWINGS

The invention may best be understood by referring to the following description and accompanying drawings that are used to illustrate embodiments of the invention. In the drawings:

FIGS. 9A-B illustrate updated routing tables of a multi-chassis link aggregation group according to one embodiment of the invention.

DETAILED DESCRIPTION

Figure 1A:
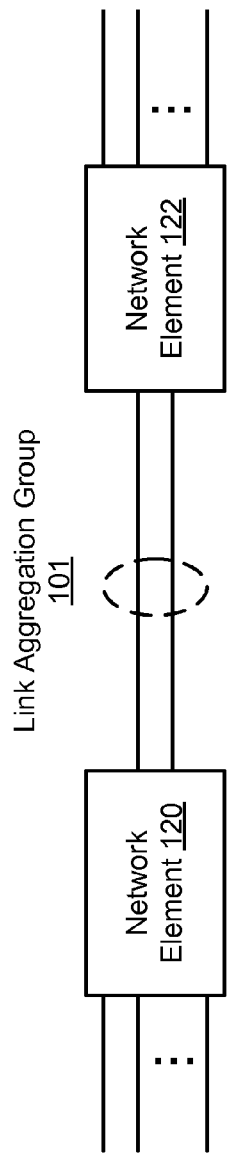
FIG. 1A is a diagram of a link aggregation group between two network elements.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network element) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, which communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next-hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network elements to exchange routes and select those routes based on one or more routing metrics. In addition, the control plane also typically includes ISO layer 2 control protocols such as Rapid Spanning Tree Protocol (RSTP), Multiple Spanning Tree Protocol (MSTP), and SPB (Shortest Path Bridging), which have been standardized by various standard bodies.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries that are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network element can store one or more bridging tables that are used to forward data based on the layer 2 information in that data.

Typically, a network element includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network elements through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network element), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network elements. A physical node is implemented directly on the network element, whereas a virtual node is a software, and possibly hardware, abstraction implemented on the network element. Thus, multiple virtual nodes may be implemented on a single network element.

A network interface may be physical or virtual; and an interface address is an IP address assigned to a network interface, be it a physical network interface or virtual network interface. A physical network interface is hardware in a network element through which a network connection is made (e.g., wirelessly through a wireless network interface controller (WNIC) or through plugging in a cable to a port connected to a network interface controller (NIC)). Typically, a network element has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network element, are referred to as IP addresses of that network element; at a more granular level, the IP address(es) assigned to network interface(s) assigned to a node implemented on a network element, can be referred to as IP addresses of that node.

Some network elements provide support for implementing VPNs (Virtual Private Networks) (e.g., Layer 2 VPNs and/or Layer 3 VPNs). For example, the network element where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network elements). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network element that supports multiple contexts may be deployed as a PE; and a context may be configured with a VPN protocol, and thus that context is referred as a VPN context.

Some network elements provide support for VPLS (Virtual Private LAN Service) (RFC 4761 and 4762). For example, in a VPLS network, subscriber end stations access content/services provided through the VPLS network by coupling to CEs, which are coupled through PEs coupled by other network elements. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

Terms

The following terms may be used in the description.

Local chassis: The local entity of a multi-chassis link aggregation group. In this specification, the terms "local chassis" and "local network element" are used interchangeably.

Peer chassis: The peer entity of a local chassis within a same multi-chassis link aggregation group. A local chassis may contain more than one peer chassis. In this specification, the terms "peer chassis" and "peer network element" are used interchangeably.

Remote node: The end of a multi-chassis link aggregation group where a single entity participates the multi-chassis link aggregation group. A remote node sometimes is referred to as a partner node. In this specification, the term "remote node" and "remote network element" are used interchangeably.

Link aggregation group (LAG): A group of links that appear to a client of a link aggregation group as if they were a single link. A LAG can connect one or more chassis in one end or both ends of the LAG. When a LAG connects to multiple chassis at one end of connection, the LAG is referred to as a multi-chassis link aggregation group (MC-LAG).

Inter-peer link: A group of one or more links communicatively coupled to both a local chassis and a peer chassis of a MC-LAG. Inter-peer link may coordinate communication between the local chassis and the peer chassis. It may also carry traffic of the MC-LAG. In this specification, the term "inter-peer link" and "inter-chassis link" are used interchangeably.

Existing Routing and Fault Recovery Schemes and Considerations of MC-LAG

Routing and fault recovery in a non-multi-chassis environment have been disclosed in prior art. For example, for providing real time services such as video, voice, and TV, IP transport uses IP Fast Reroute (IPFRR) to address the problem of routing protocols convergence time being too long. In approaches such as IPFRR, a routing protocol prepares for failure of adjacent links or nodes, and pre-provisions the forwarding plane with a backup path. The forwarding plane is then able to react upon receipt of a failure event and switch from a primary to a backup path without waiting for the routing protocol to gather updated network information and converge.

A number of IPFRR schemes have been proposed. For example:

Loop Free Alternates (LFA) is used to provide IPFRR based on Interior Gateway Protocols (IGPs) such as OSPF and ISIS. An IGP running within a router build a database which tracks all links with the applicable network area. LFA computes loop free alternate routes using the IGP database.

BGP diverse path, BGP best external, and BGP add-paths give BGP routers the capability to distribute and learn multiple alternates for a single prefix and the ability to realize IPFRR.

Maximally Redundant Trees (MRTs) is based on knowledge of the topology of a network provided by an IGP.

Statically configured IPFRR is based on manually configured primary and backup paths for a specified prefix.

The existing IPFRR schemes do not work well with MC-LAG. For example, the case when a link in a peer chassis is in a standby or backup state is not handled. A multi chassis IPFRR solution needs to take into consideration that the peer chassis standby links must become active before switching over traffic. If not, then traffic is likely to loop intermittently between the chassis, which may cause severe traffic congestion on the inter-peer link.

In addition, the existing IPFRR schemes do not have functionality to provide protection for routes discovered by ARP (address resolution protocol) or ND (neighbor discovery protocol) and interface routes in a transparent way so that applications does not need to be aware of the MC-LAG state.

A robust fault recovery scheme in a MC-LAG environment should take the following into consideration:

The scheme needs to minimize traffic disturbance in case of MC-LAG switchover and provide transparency to an application using traffic forwarding so that the application does not need to be aware of the state of the MC-LAG being active or standby.

Before installing an IPFRR backup path at a peer chassis, the scheme needs to know the links of the peer chassis being in active or standby state.

Before installing the IPFRR backup path at the peer chassis, the scheme needs to know that the peer chassis is prepared to forward traffic over the MC-LAG before switching to the backup path to the peer chassis. This is necessary to prevent traffic to loop back and forth between the local chassis and the peer chassis in a case where there is a need to bring a link from backup to active state at the time of failure.

Network Configuration and Settings of Multi-Chassis Link Aggregation Group

Figure 1B:
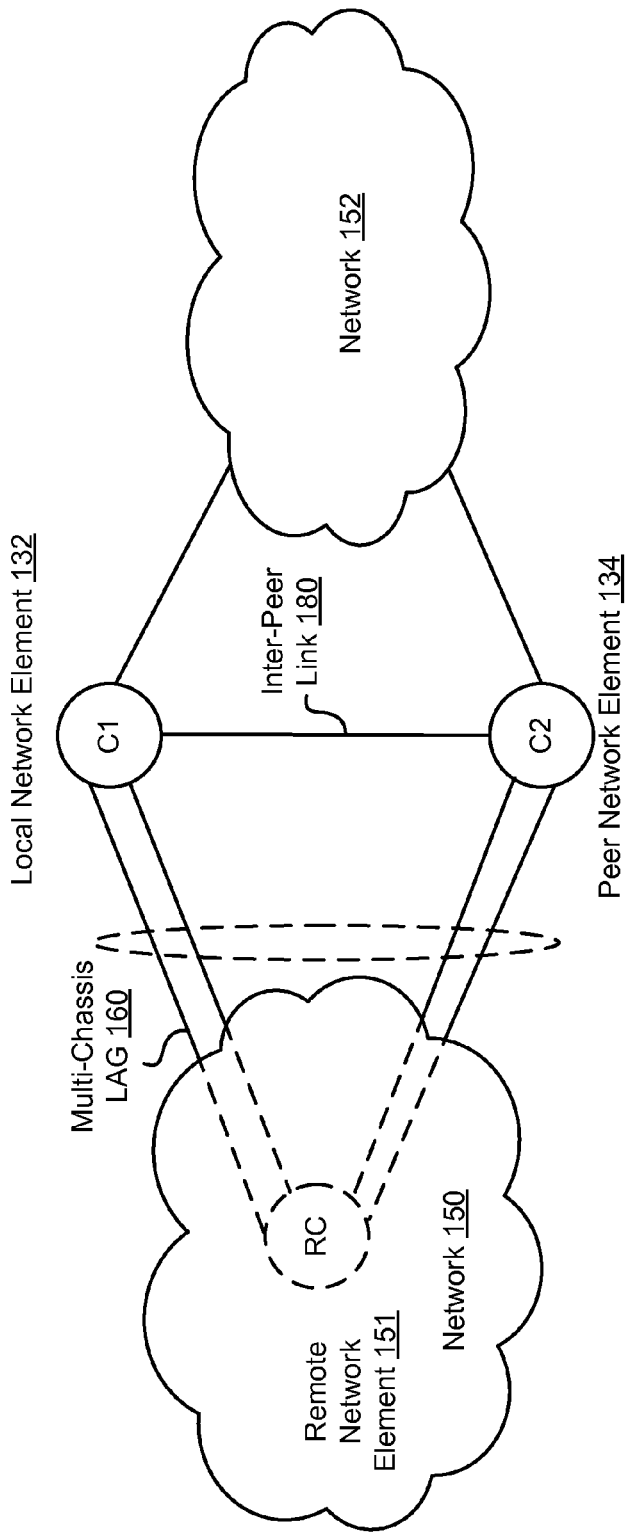
FIG. 1B is a diagram illustrating link aggregation over multiple chassis.
Figure 2:
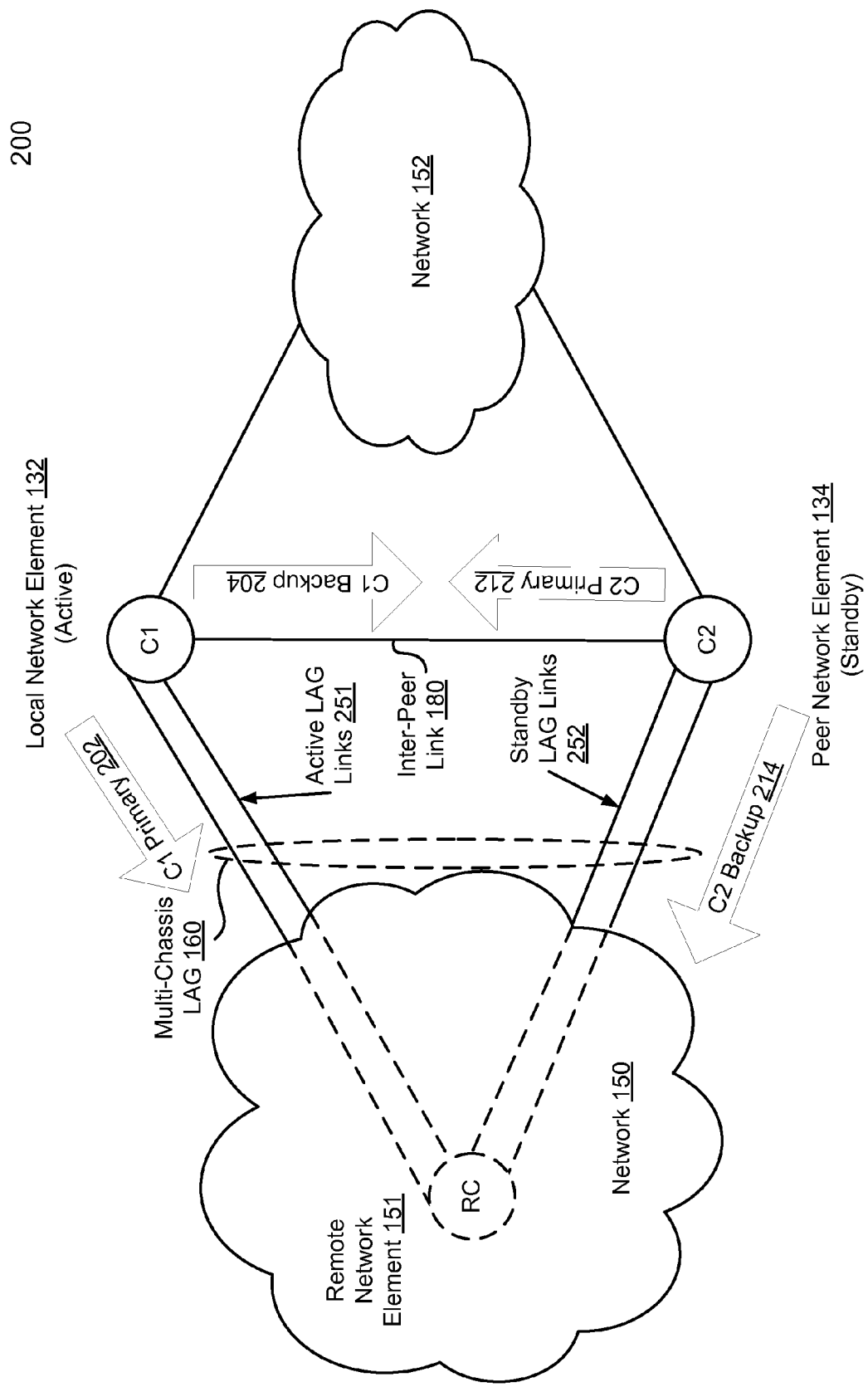
FIG. 2 illustrates network configuration and operations of a multi-chassis link aggregation group according to one embodiment of the invention.

FIG. 2 illustrates network configuration and operations of a multi-chassis link aggregation group according to one embodiment of the invention. FIG. 2 is similar to FIG. 1B and the same or similar references indicate elements or components having the same or similar functionalities. In MC-LAG 160, the multiple chassis C1 and C2 appear as a single network element to the remote network element RC. The same IP address(es) will be configured on each chassis. MC-LAG 160 may operate without providing redundancy, in which case both the links between RC and C1 and the links between RC and C2 actively transport traffic between RC and the multiple chassis. MC-LAG 160 offers more transport capacity than a single chassis configuration. However, operating MC-LAG 160 with all links being active does not provide redundancy against traffic failure.

In order to provide redundancy in MC-LAG 160, the links between RC and C1 and the links between RC and C2 can be provisioned so that one group of links is active and the other group of the links is standby. Each group of links is associated with an aggregated state. In one embodiment, the aggregate state of a group of links can be active, standby, or down. A group of links is active when a number of links within the group of links are up and they transmit traffic associated with the MC-LAG. A group of links is standby when a number of links within the group of links are up but they do not transmit traffic associated with the MC-LAG. Note standby links may transmit control traffic coordinating the operation of the MC-LAG. In other words, standby links may transmit control traffic but not user traffic associated with the MC-LAG. A group of links is down when they cannot transmit any traffic. Note the aggregated states may not be categorized as active, standby, and down verbatim, but they may be defined similarly to these categories in one embodiment.

The chassis coupled to the active links is an active chassis (i.e., active network element); the chassis coupled to standby links is a standby chassis (i.e., standby network element). Note that a chassis may support multiple LAGs where it is coupled to active links for one LAG and standby links for another LAG. Thus a chassis may be active for one MC-LAG but standby for another MC-LAG. While the discussion of embodiments of the invention focuses on a single LAG in a MC-LAG, the principle disclosed herein applies to multiple LAGs in a MC-LAG.

Referring to FIG. 2, the links between RC (remote network element 151) and C1 (local network element 132) are active LAG links 251. The links between RC and C2 (peer network element 134) are standby LAG links 252. The states of the links are communicated between the chassis. The communication is through inter-peer link 180 in one embodiment. The communication includes a common reference to MC-LAG 160 in one embodiment. The communication may convey the aggregate state or individual state of each link of the active LAG links 251 and standby LAG links 252. The communication may be through a protocol exchange between C1 and C2. The protocol exchange may comply with an implementation of inter-chassis control protocol (ICCP). Note the protocol exchange may utilize other suitable standardized protocols or proprietary protocols.

In one embodiment, a policy is defined to determine the aggregate state of the links in MC-LAG 160 of network elements C1 and C2. The policy may set a minimal number of links to be in active or standby state for the links to be qualified to have an aggregate state of active or standby.

For MC-LAG 160, C1 and C2 are the active network element and the standby network elements respectively, based on the aggregate states of the links coupled to chassis C1 and C2. With regard to traffic routing/forwarding, traffic reaching C1 uses active LAG links 251 as the primary path at reference 202, and it uses inter-peer link 180 as the backup path. That is, C1 will try to route/forward traffic to active LAG links 251 first and inter-peer link 180 second if the primary next-hop has failed. Note for the primary path and backup path pairing to work properly, inter-peer link 180 needs to have enough capacity to carry traffic routing to active LAG links 251. That is, inter-peer link 180 plays dual roles in MC-LAG 160, it coordinates communications between local network element 132 C1 and peer network element 134 C2, and it may also transports traffic of MC-LAG 160 to provide redundancy upon failure. In contrast, traffic reaching C2 uses inter-peer link 180 as the primary path at reference 212 and it uses standby LAG links 252 as the backup path. In other words, in normal operation, traffic reaching C2 is forwarded through inter-peer link 180 to C1 (C2 primary 212), and then it is forwarded through active LAG links 251 (C1 primary 202) to reach remote network element 151. That is, in normal operation, traffic reaching either C1 or C2 is forwarded to remote network element 151 through active LAG links 251, and from the view of remote network element 151, the traffic is from one single interface. When there is a failure in the primary path, traffic reaching C1 and C2 may be able to be re-routed through backup paths, thus an embodiment of the invention provides fast re-route through primary and backup path settings as described in more details herein below.

Operations of Multi-Chassis Link Aggregation Group Upon Failure

Figure 3:
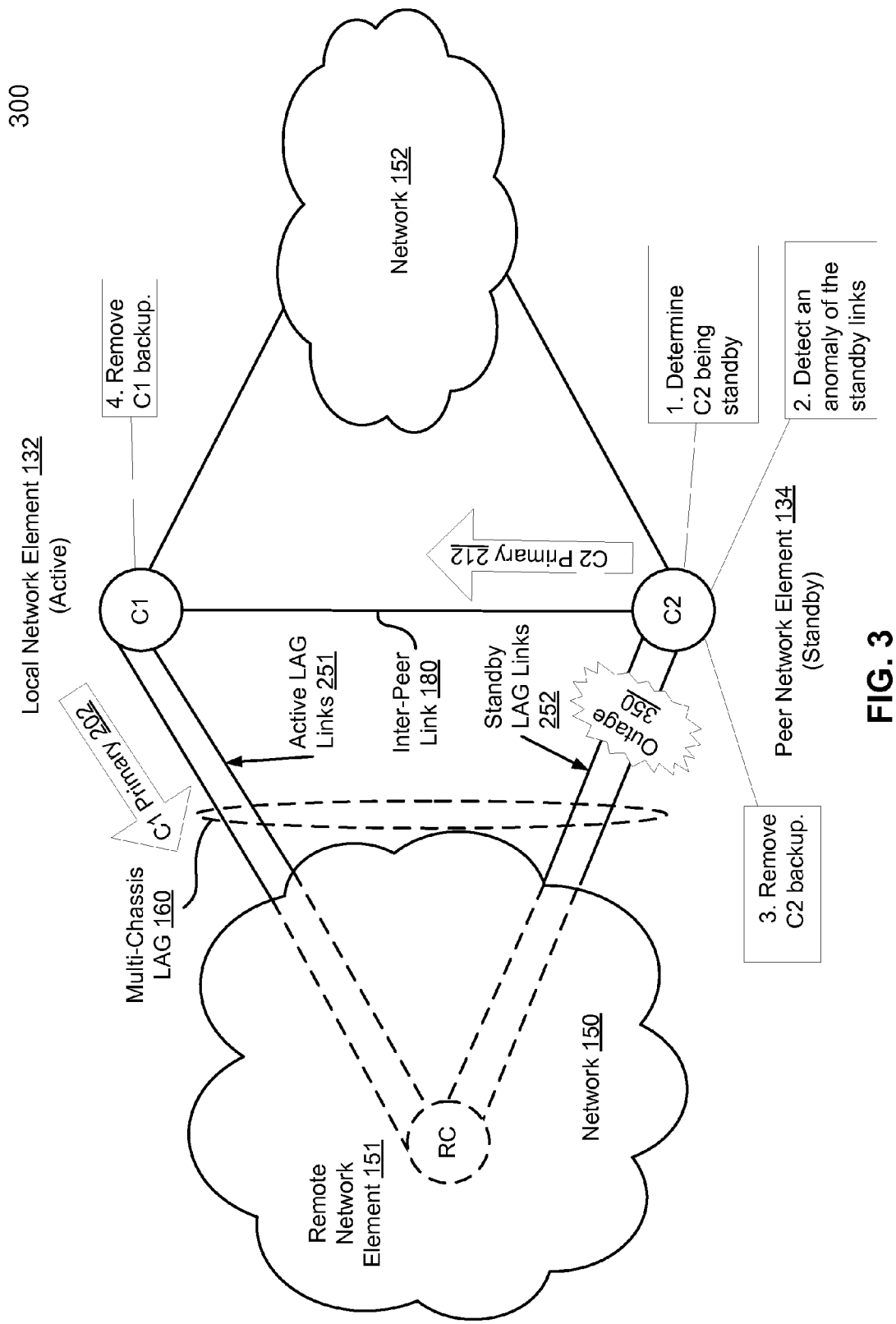
FIG. 3 illustrates operations of a multi-chassis link aggregation group upon standby link failure according to one embodiment of the invention.

FIG. 2 illustrates the network configurations and settings of a MC-LAG. The settings are for the purpose of providing redundancy upon failure. FIG. 3 illustrates operations of a multi-chassis link aggregation group upon standby link failure according to one embodiment of the invention. FIG. 3 is similar to FIG. 2 and the same or similar references indicate elements or components having the same or similar functionalities. Task boxes 1 to 4 illustrate the order in which operations are performed according to one embodiment of the invention. Note the standby LAG links 252 have an outage at reference 350. Outage 350 may be caused by link degradation, failure, or other anomalies on standby LAG links 252.

At task box 1, it is determined that C2 is a standby chassis (i.e., standby network element). The determination may be made by C2 based on individual states or an aggregate state of the coupled links (i.e., standby LAG links 252), or the determination may be made by C1 and communicated to C2 through inter-peer link 180. In one embodiment, the determination may be made by a third entity based on link statuses of the active LAG links 251 and standby LAG links 252.

C2 monitors the health of coupled standby LAG links 252. At task box 2, C2 detects an anomaly of standby LAG links 252 caused by outage 350. After the anomaly of standby LAG links 252 is detected, the C2 backup is removed at task box 3 as standby LAG links 252 is no longer available as a backup path. The local network element 132 (C1) is notified of the anomaly of standby LAG links 252. At task box 4, the C1 backup is removed from C1 settings as traffic reaching C1 can no longer re-route to inter-peer link 180 and then go through standby LAG links 252 and reach remote network element 151.

Note that task boxes 3 and 4 may perform their operations concurrently or the setting change may happen on C1 before C2 depending on implementation. Also note that also the depicted scenario is for a link outage, the same setting change will be triggered if the anomaly is happened for a different failure along the communication path between remote network element RC and C2. For example, the detected anomaly may also be a transceiver failure of C2 facing RC. In short, a failure of standby links in communication triggers de-provisioning fast re-route settings of a MC-LAG according to one embodiment of the invention.

Figure 4:
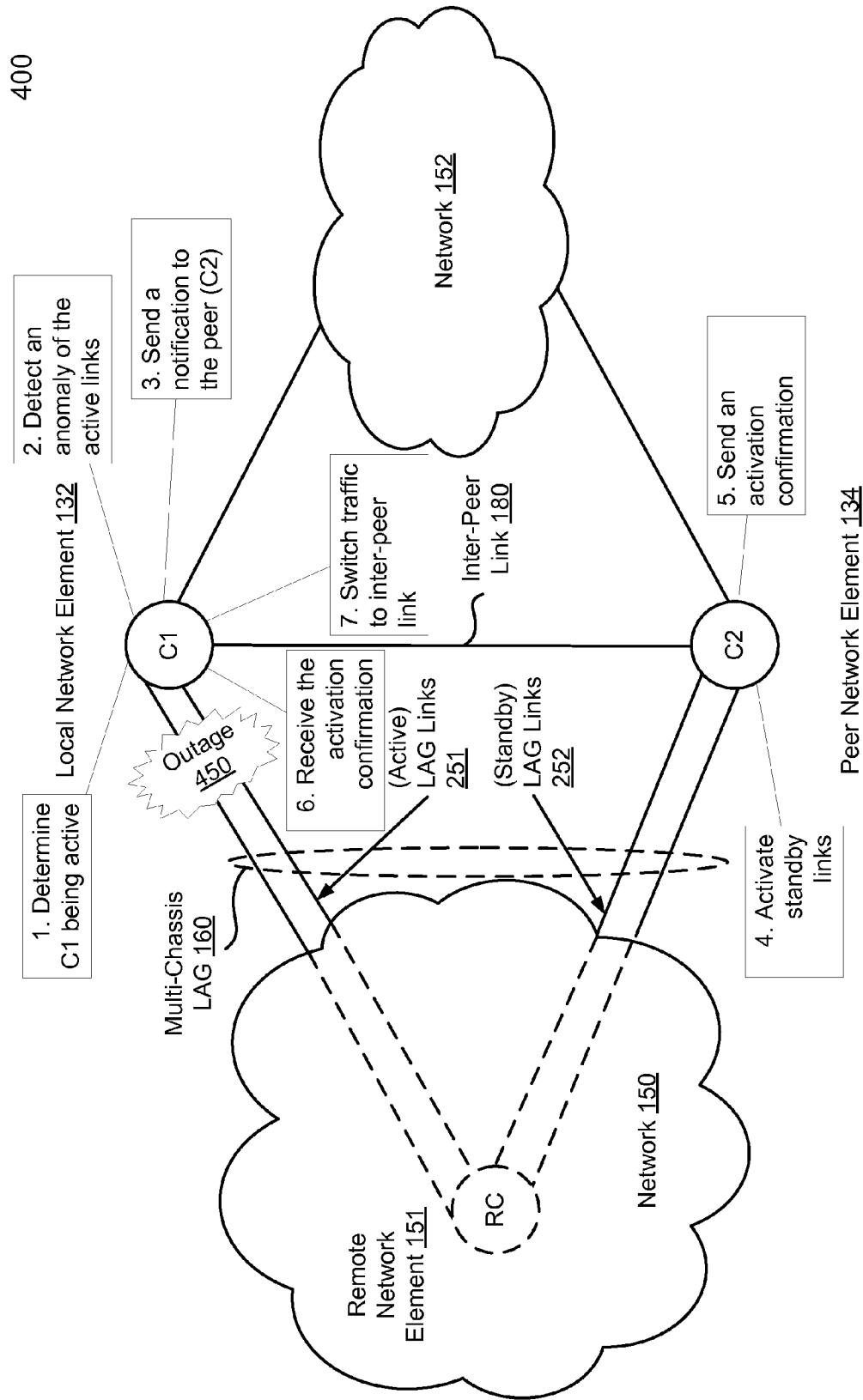
FIG. 4 illustrates operations of a multi-chassis link aggregation group upon active link failure according to one embodiment of the invention.

FIG. 4 illustrates operations of a multi-chassis link aggregation group upon active link failure according to one embodiment of the invention. FIG. 4 is similar to FIG. 3 and the same or similar references indicate elements or components having the same or similar functionalities. Task boxes 1 to 7 illustrate the order in which operations are performed according to one embodiment of the invention. Note that active LAG links 251 have an outage at reference 450. Outage 450 may be caused by link degradation, failure, or other anomalies on active LAG links 251.

At task box 1, it is determined that C1 is an active network element. The determination may be made by C1 based on individual states or an aggregate state of the coupled links (i.e., active LAG links 251), or the determination may be made by C2 and communicated to C1 through inter-peer link 180. In one embodiment, the determination may be made by a third entity based on link statuses of the active LAG links 251 and standby LAG links 252.

C1 monitors the health of coupled active LAG links 251. At task box 2, C1 detects an anomaly of active LAG links 251 caused by outage 450. Upon detecting the anomaly, C1 sends a notification to peer network element C2 at task box 3. The notification indicates a request to switch traffic away from active LAG links 251. The notification is sent through inter-peer link 180 in one embodiment. Note that in one embodiment, where there are multiple peer network elements, the notification may further indicate a distribution of traffic in the notification to each peer network element. The distribution of traffic may be based on a policy of MC-LAG 160, and the policy may consist of a hashing mechanism which load balances the traffic. Or the policy may be based on priorities of peer network elements. The policy may be implemented at local network element 132, peer network element 134, or a third entity.

The peer network element 134 (C2) receives the notification sent from local network element 132 (C1). At task box 4, C2 activates standby LAG links 252. As standby links, these links are up but not transmitting user traffic of MC-LAG 160. These links may transmit control messages between remote network element 151 (RC) and C2 (e.g., protocol exchanges through an implementation of Link Aggregation Control Protocol, LACP). The activation may ensure that standby LAG links 252 are able to carry traffic about to switch over or it may alternatively ensure that traffic destined for MC-LAG 160 will not be looped back through inter-peer link 180 to C1. Once activation is complete, C2 sends an activation confirmation to C1 at task box 5.

At task box 6, local network element 132 (C1) receives the activation confirmation sent by peer network element 134 (C2). With the confirmation, now C1 switches traffic from active LAG links 251 to inter-peer link 180 at task box 7. The traffic then reaches C2, and passes through links 252, which is now active. With outage 450 on links 251, the aggregate state of these links becomes down. After traffic switches over, the primary path for C1 is through inter-peer link 180, and it no longer has a backup path. Similarly, the primary path for C2 is the newly activated links 252, and it no longer has a backup path.

Note once outage 450 is fixed, LAG links 251 will be up. The aggregate state of LAG links 251 may become standby; local network element 132 (C1) and peer network element 134 (C2) will be able to add backup paths respectively to enhance robustness of MC-LAG 160.

With coordinated switchover illustrated in FIG. 4, traffic disruption caused by outage 450 is small as the coordination starts right after detecting the anomaly at the active links. There is no traffic loop as activation of standby links occurs before switching events, so traffic loop, even a transient one, is avoided. In addition, since switching happens only when local network element 132 (C1) receives the activation confirmation from the peer network element 134 (C2), traffic is switched to inter-peer link 180 only when the standby LAG links 252 are activated. Thus, bandwidth of Inter-peer link 180 is not wasted by unsuccessful traffic switchovers. The coordinated switchover can be performed on multiple peer network elements when more than one peer network elements are provisioned.

Figure 5:
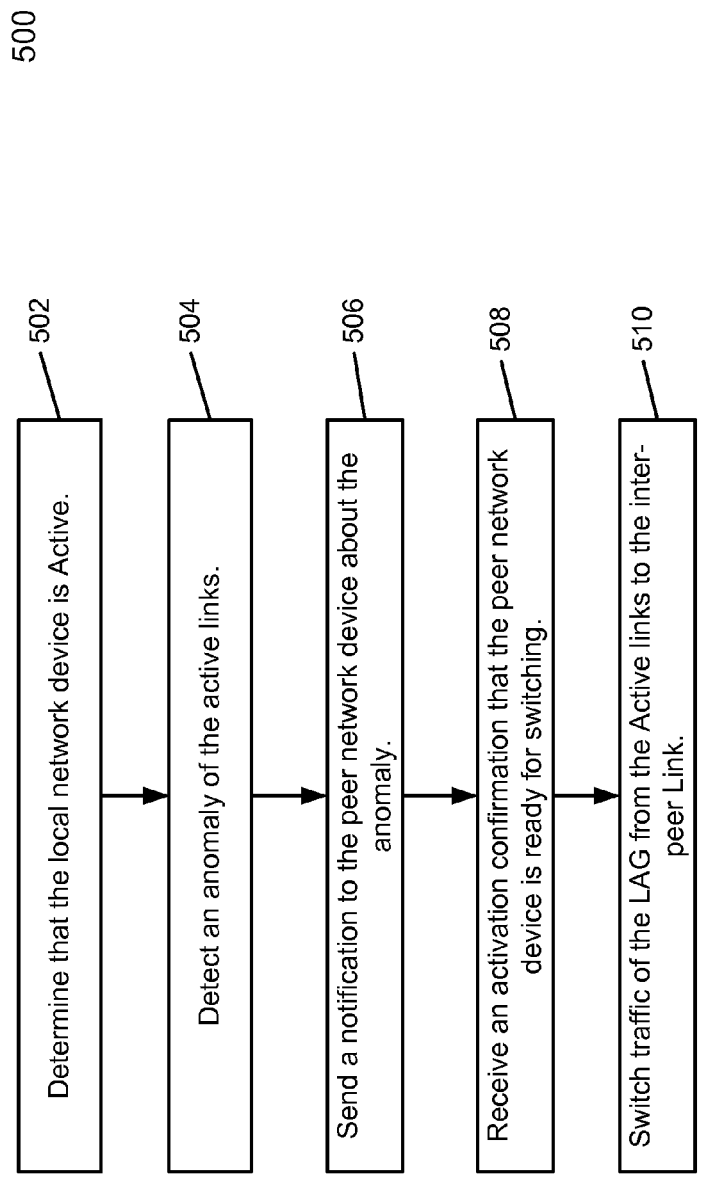
FIG. 5 is a flow diagram illustrating operations of a multi-chassis link aggregation group upon active link failure according to one embodiment of the invention.

FIG. 5 is a flow diagram illustrating operations of a multi-chassis link aggregation group upon active link failure according to one embodiment of the invention. Method 500 may be implemented on a network element that is a part of a multi-chassis link aggregation group (MC-LAG) (e.g., local network element 132 in FIG. 4). The MC-LAG contains a local interface and a remote interface, and the local interface is a logical interface formed by a number of network elements including the network element (referred to as local network element) and one or more peer network elements. The remote interface is at a remote network element couple to the MC-LAG through links. The local network element communicates with a peer network element through an inter-peer link.

At block 502, the local network element determines that the local network element is active. The determination is made based on checking an aggregate state of the links coupled to the local network element being active. The aggregate state of the links being active means a number of the coupled links is up and transmitting traffic of the MC-LAG. In one embodiment, the aggregate state of the links can further be standby or down, where standby links are up but not transmitting traffic of the MC-LAG and down links do not carry traffic. The aggregate state of the links may be determined through a protocol exchange with the peer network element of the MC-LAG. The protocol exchange may comply with an implementation of inter-chassis control protocol (ICCP) and be performed through the inter-peer link. Other suitable protocols may also perform the protocol exchange.

In one embodiment, a policy is placed to determine the aggregate state of the links or the local and peer network elements. The policy may set a minimal number of links to be in active or standby state for the links to be qualified to have an aggregate state of active or standby.

At block 504, the local network element detects an anomaly of the active links. The anomaly may be caused by be caused by link degradation, failure, or other network element related issues such as transceiver failure at local or remote network elements coupled to the active links. The detection may be based on a threshold number of links of the active links malfunctioning. In one embodiment, the threshold number of links of the active links for detecting the anomaly is configurable.

At block 506, the local network element sends a notification to the peer network element about the detected anomaly. The notification may be sent through the inter-peer link, and it may be embedded in a message of a layer 2 or layer 3 protocol in one embodiment. Once the peer network element receives the notification about the anomaly, it activates standby links in preparation of switching over the traffic of the MC-LAG. After activation successfully completes, the peer network element sends out an activation confirmation to the local network element.

At block 508, the local network element receives the activation confirmation that the peer network element is ready for switching. If the activation confirmation is not received at the local network element (the local network element may set a time period to wait for the activation confirmation), the process completes without traffic switching to the peer network element. Otherwise the process goes to block 510, where the local network element switches traffic of MC-LAG from the previously active links to the inter-peer link. In one embodiment, the switch traffic is forwarded based on matching an IP address prefix of one of a static route and a route learned dynamically through a protocol exchange.

Note that method 500 applies when the local network element and multiple peer network elements form the local interface. When multiple peer network elements are coupled with the local network element, the notification of block 506 may further indicate a distribution of traffic in the notification to each peer network element. The distribution of traffic may be based on a policy of the link aggregation group, and the policy may consist of a hashing mechanism which load balances the traffic. Or the policy may be based on priorities of peer network elements. The policy may be implemented at the local network element, one or each of the peer network elements, or a third entity.

The operations disclosed in FIGS. 2-5 may be further illustrated in Table 1.

TABLE 1

Network Element States and Coordinated Switchover

| Local Network Element State | Peer Network Element State | Primary Path | Backup Path | Switchover Condition | Comments |
|---|---|---|---|---|---|
| Active | Active | Local Links | Inter-peer Link | Local failure | Not applicable to active-standby use case. Normal condition for active-active scheme. |
| Active | Down | Local Links | Not Applicable | Not Applicable | None |
| Active | Standby | Local Links | Inter-peer Link | Local failure + readiness indication from peer network element | Normal condition for active network element in active-standby scheme. |
| Active | Unknown | Local Links | Not Applicable | Not Applicable | None |
| Down | Active | Inter-peer Link | Not Applicable | Not Applicable | None |
| Down | Down | Not Applicable | Not Applicable | Not Applicable | None |
| Down | Standby | Not Applicable | Not Applicable | Not Applicable | Transient state |
| Down | Unknown | Not Applicable | Not Applicable | Not Applicable | None |

TABLE 1-continued

Network Element States and Coordinated Switchover

| Local Network Element State | Peer Network Element State | Primary Path | Backup Path | Switchover Condition | Comments |
|---|---|---|---|---|---|
| Standby | Active | Inter-peer Link | Local Links | Peer failure + readiness indication at local network element | Normal condition for standby network element in active-standby scheme. |
| Standby | Down | Not Applicable | Not Applicable | Not Applicable | Transient state |
| Standby | Standby | Not Applicable | Not Applicable | Not Applicable | Transient state |
| Standby | Unknown | Not Applicable | Not Applicable | Not Applicable | Transient state |

Note the table lists all permutations of states of local and peer network elements. The state of unknown is treated as down in this embodiment. Local links are the links coupled to the local network element. Note the coordinated switchover requires two conditions to complete the operations, one is a failure, being a link failure or a hardware associated with communication through the links, and the other is that a pairing network element, being a local network element or a peer network element, indicates readiness to perform switchover. The coordination prevents traffic loop, thus it is akin to a fast re-routing mechanism.

Routing Enhancement for Multi-Chassis Link Aggregation

With links of an MC-LAG being provisioned active and standby, not only a coordinated switchover disclosed herein above is feasible to avoid traffic loop, but also routing may be enhanced with an additional next-hop selection. A next-hop refers to the next closest network element a packet of a traffic stream will be delivered to. For example, next-hop may be an IP address entry in a router's routing database (e.g., a routing table), which specifies the next closest or most optimal router for a packet of a traffic stream. A network element often contains two types of routing databases, one is a Routing Information Base (RIB) and the other is Forwarding Information Base (FIB). The RIB is in the control plane conceptually and it contains routing information to map routes to a set of next-hops. The RIB passes selected routing information to the FIB, which is in the data plane conceptually and the FIB uses the routing information to forward packet to one of the set of next-hops. The interaction between RIB and FIB is known in the art thus this specification does not provide detail description of the operations.

Figure 6:
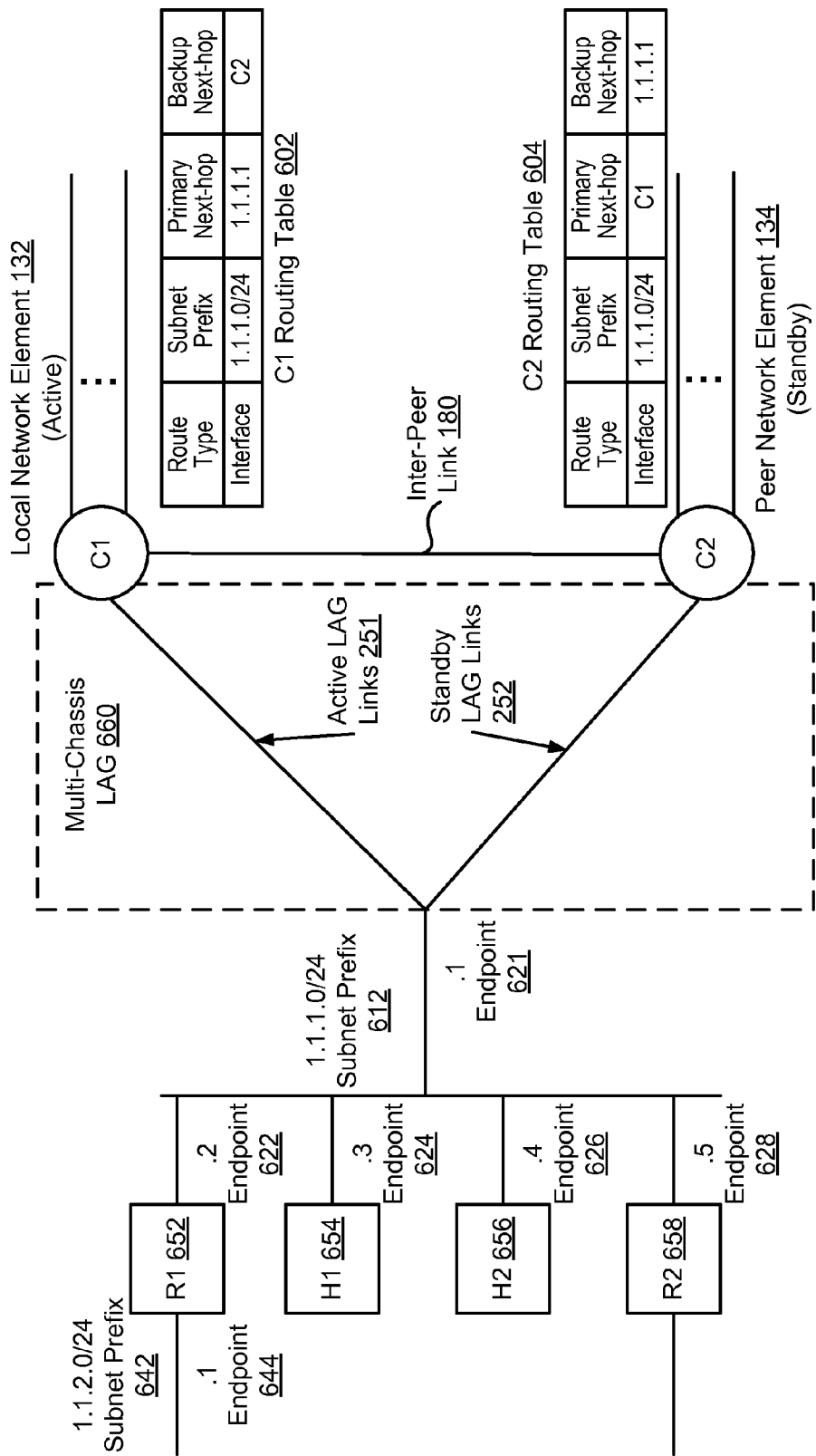
FIG. 6 illustrates redundant next-hop settings of interface routes of a multi-chassis link aggregation group according to one embodiment of the invention.

FIG. 6 illustrates redundant next-hop settings of interface routes of a multi-chassis link aggregation group according to one embodiment of the invention. The multi-chassis link aggregation group (MC-LAG) 660 contains local network element 132 (C1) and peer network element 134 (C2) forming one logical interface with the same IP address, the IP address is endpoint 1.1.1.1 at reference 621. For network elements connects to subnet 1.1.1.0/24, MC-LAG 660 has several neighbors, such as network elements R1, H1, H2, and R2 at references 652-658, which have end points 0.2, 0.3, 0.4, and 0.5 respectively in the 1.1.1.0/24 subnet at references 622-628. Note the respective endpoints of R1, H1, H2, and R2 is one endpoint of the network elements, and these network elements may contain additional endpoints at a different subnet. For example, network element R1 at reference 652 has a 0.1 endpoint at reference 644, which is under subnet 1.1.2.0/24 at reference 642.

Within MC-LAG 660, C1 is coupled to active LAG links at reference 251, and C2 is coupled to standby LAG links at reference 252. The link states of active or standby is based on aggregate states of the links. As disclosed herein above, C1 and C2 are determined to be the active and standby network elements respectively. For the active network element C1, an entry in routing table 602 is set as an interface route. An interface route refers to the route corresponding to a subnet address of an interface. The interface is needed for packet routing. For example, the interface may be used to resolve an IP address using various protocols such as an implementation of address resolution protocol (ARP) in IP version 4 (IPv4) or an implementation of neighbor discovery (ND) in IP version 6 (IPv6). The interface route includes a field indicating the subnet prefix that MC-LAG 660 connects to, 1.1.1.0/24. It further includes a primary next-hop and a backup next-hop. The primary next-hop points to endpoint 0.1 the local representation of the logical MC-LAG interface at reference 621. The backup next-hop points to the peer network element C2, represented by an IP address. That is, the active network element C1 will resolve/route/forward traffic to the remote network element of the MC-LAG first unless it does not work for some reason (e.g., link outage), in which case it will attempt to route/forward traffic to its peer network element (backup next-hop). Thus the routing/forwarding is more robust against failure within the network.

At the standby network element C2, a similar entry is kept in its routing table 604 with a corresponding interface route for the subnet address of the interface. The interface route includes a field indicating the same subnet prefix that MC-LAG 660 connects to. Yet the primary next-hop and backup next-hop are provisioned differently. At routing table 604, the primary next-hop is set to be the active network element C1, represented by an IP address, and the backup next-hop is endpoint 0.1 the local representation of the logical MC-LAG interface at reference 621. With the settings of routing tables 602 and 604, the interface routes for both local and peer network elements are provisioned with redundancy.

In one embodiment, the next-hop settings of primary next-hop and backup next-hop are based on the state of the local network elements and peer network element. Table 2 illustrates the next-hop settings of the embodiment.

TABLE 2

Network Element States and Next-Hop Settings

| Local Network Element State | Peer Network Element State | Local Network Element Primary Next-Hop | Local Network Element Backup Next-Hop |
|---|---|---|---|
| Active | Active | Remote Network Element | Not Applicable |
| Active | Down | Remote Network Element | Not Applicable |
| Active | Standby | Remote Network Element | Peer Network element |
| Active | Unknown | Remote Network Element | Not Applicable |
| Down | Active | Peer Network Element | Not Applicable |
| Down | Down | Not Applicable | Not Applicable |
| Down | Standby | Not Applicable | Not Applicable |
| Down | Unknown | Not Applicable | Not Applicable |
| Standby | Active | Peer Network Element | Remote Network Element |
| Standby | Down | Not Applicable | Not Applicable |
| Standby | Standby | Not Applicable | Not Applicable |
| Standby | Unknown | Not Applicable | Not Applicable |

Figure 7:
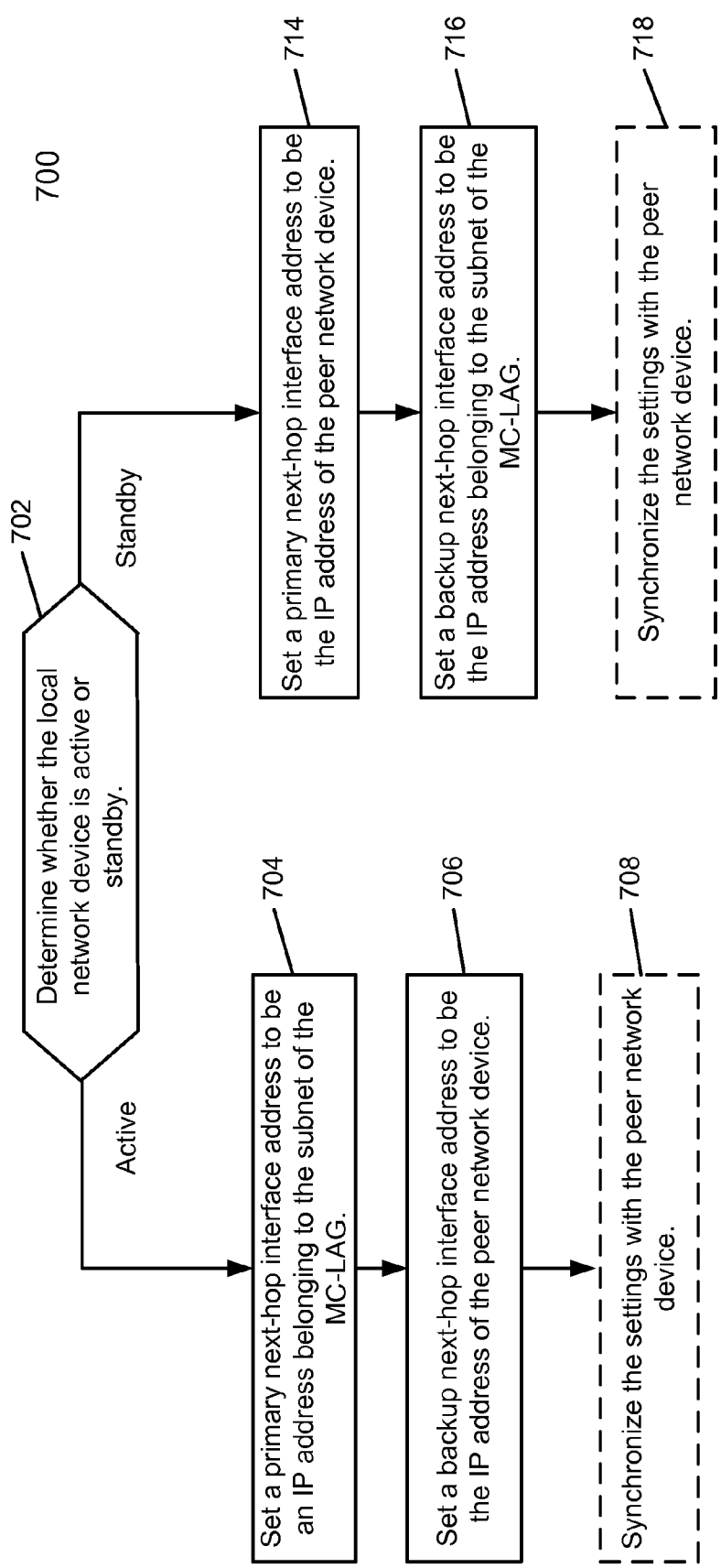
FIG. 7 is a flow diagram illustrating redundant next-hop settings of interface routes of a multi-chassis link aggregation group according to one embodiment of the invention.

FIG. 7 is a flow diagram illustrating redundant next-hop settings of interface routes of a multi-chassis link aggregation group according to one embodiment of the invention. Method 700 may be implemented on a network element that is a part of a multi-chassis link aggregation group (MC-LAG) (e.g., local network element 132 in FIG. 6). The MC-LAG contains a local interface and a remote interface, and the local interface is a logical interface formed by a number of network elements including the network element (referred to as local network element) and one or more peer network elements. The remote interface is at a remote network element couple to the MC-LAG through links. The local network element communicates with a peer network element through an inter-peer link.

The method starts at block 702, where it is determined whether the local network element is active or standby. The determination is made based on checking an aggregate state of the links coupled to the local network element being active or standby. As discussed herein above, the aggregate state of the links being active means a number of the coupled links are up and transmitting traffic of the MC-LAG, while the aggregate state of the links being standby means a number of the coupled links are up but not transmitting traffic of the MC-LAG.

When it is determined that the local network element is active, the method goes to block 704, where the local network element sets a primary next-hop interface address of the local network element to be an IP address belonging to the subnet of the MC-LAG. The method further sets a backup next-hop interface address to be the IP address of the peer network element at block 706. In one embodiment, the settings of the primary and backup next-hop interface addresses, along with other parameters such as link aggregation state and IP subnet prefix, are synchronized with the settings of the peer network element through a protocol exchange with the peer network element at block 708. The synchronization is performed through a protocol exchange between the local network element and remote network element through an inter-peer link in one embodiment. The protocol exchange complies with an implementation of inter-chassis control protocol (ICCP) in one embodiment.

When it is determined that the local network element is standby, the method goes to block 714. The local network element also sets up a primary next-hop interface addresses and a backup next-hop interface address. At block 714, the local network element sets up the primary next-hop interface address to be the IP address of the peer network element. At block 716, the local network element sets up the backup next-hop interface address of the local network element to be the IP address belonging to the subnet of the MC-LAG. Similar to block 708, in one embodiment, the settings of the primary and backup next-hop interface addresses, along with other parameters such as link aggregation state and IP subnet prefix, are synchronized with the settings of the peer network element through a protocol exchange with the peer network element at block 718.

Figure 8:
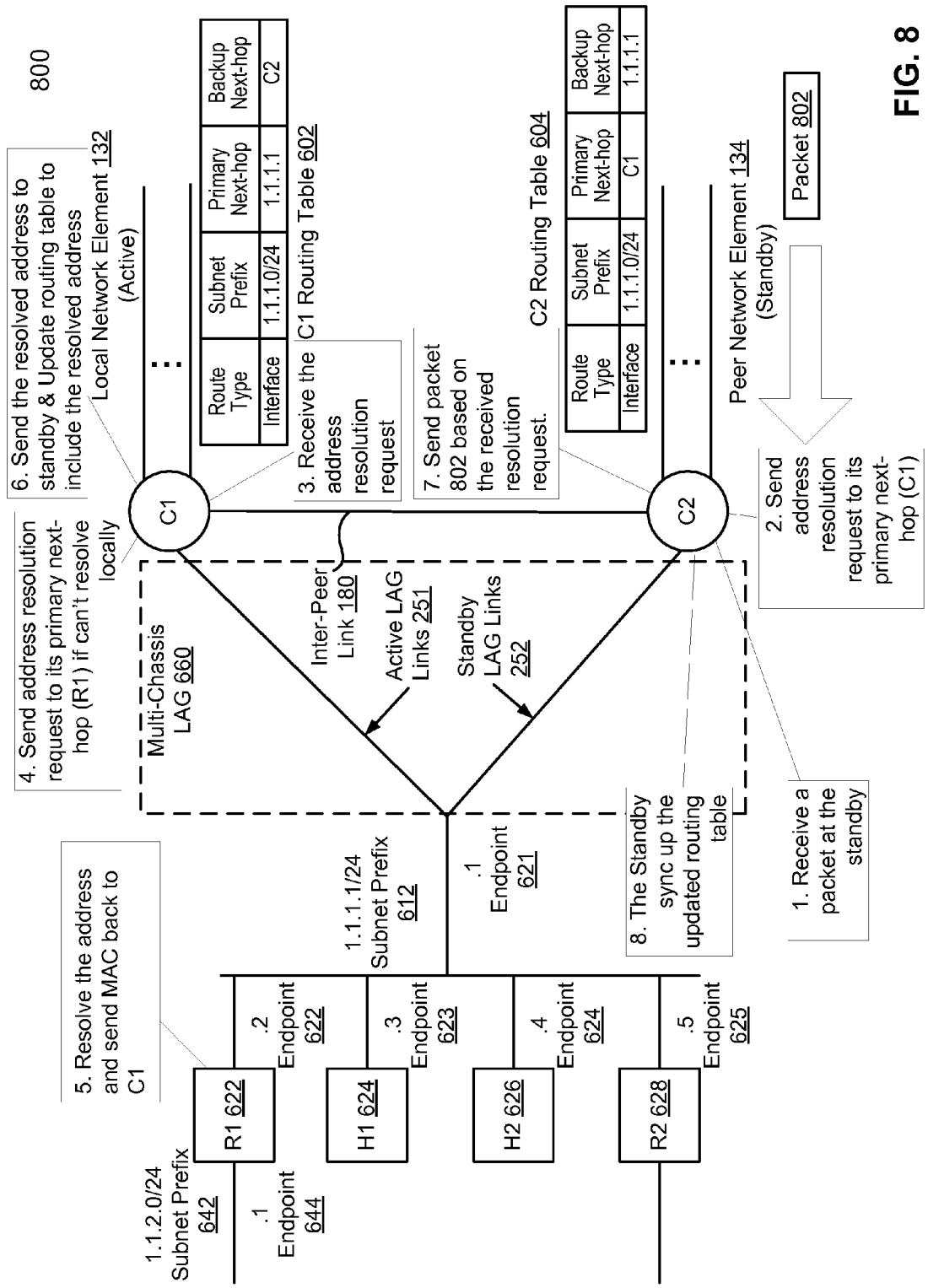
FIG. 8 illustrates an address resolution process for a packet received at a standby network element according to one embodiment of the invention.

The redundancy settings of primary and backup next-hop interface addresses help address resolution of packets, even if the packets are received at the standby network element. FIG. 8 illustrates an address resolution process for a packet received at a standby network element according to one embodiment of the invention. FIG. 8 is a continuation of FIG. 6 and the same references indicate elements or components having the same functionalities. At FIG. 8, routing tables 602 and 604 have been populated with interface route entries for subnet prefix 1.1.1.1/24 already (accomplished through an embodiment of the invention illustrated in FIG. 6 for example). Task boxes 1 to 8 in FIG. 8 illustrate the order in which operations are performed according to one embodiment of the invention.

At task box 1, packet 802 is received at peer network element 134 (C2). Assuming packet 802 is the first packet of a traffic flow and there is no entry in routing table 604 to guide routing of packet 802. Since C2 does not know how to route the packet, it needs to resolve the address. At task box 2, C2 sends an address resolution request to its primary next-hop, the address resolution request containing an IP address to be resolved to a MAC address. C2 checks C2 routing table 604 and sends the address resolution request to C1, its primary next-hop. The address resolution request may comply with an implementation of address resolution protocol (ARP) in IP version 4 (IPv4) or an implementation of neighbor discovery (ND) in IP version 6 (IPv6). In one embodiment, the address resolution request is sent through inter-peer link 180. Alternatively, C2 sends the packet itself to the primary next-hop. Note if C2 determines that C1 is unreachable or does not work properly for some reason, it may send the address resolution request to its backup next-hop, which is the remote interface of MC-LAG at 0.1 endpoint 621.

At task box 3, C1 receives the address resolution request or the packet sent by C2. If C1 sends an address resolution request to its primary next-hop, which is the remote interface of MC-LAG 660 at task box 4 as it does not contain an entry for the IP address.

At task box 6, the active network element C1 sends the resolution to standby network element C2 and also updates routing table 602 to include the resolved address. At task box 7, the standby network element C2 sends packet 802 based on received resolution request. Alternatively the packet will be sent by C1. At task box 8, the standby network element C2 synchronizes its routing table 604 with the updated C1 routing table 602. Note the operations do not have to perform at the sequence illustrated in task boxes. For example, the synchronization of routing tables may occur at the same time or before routing packet 802 based on the received resolution request.

FIGS. 9A-B illustrate updated routing tables of a multi-chassis link aggregation group according to one embodiment of the invention. In FIG. 9A, the second entry is headed by route type ARP, which denotes that the routing is resolved through IPv4 Address Resolution Protocol. The second entry is added after operations illustrated in FIG. 8 and the obtained subnet prefix is 1.1.1.2, which is an endpoint of neighbor network element R1. The primary next-hop is the endpoint of R1, which has resolved the address resolution request. The backup next-hop is C2 as C2 is the standby network element of MC-LAG 660. In FIG. 9B, the ARP entry may be not resolved by itself; rather, it may be inherited from local network element C1 through synchronization. In other words, in MC-LAG 660, address resolution results can be inherited from one of the paring network elements through a synchronization process. The advantage of the inheritance is that a standby network element of a MC-LAG may take over the handling of routing when an active network element fails. Note the routing tables 902 and 904 ignore parameters not essential to embodiments of the invention. For example, the corresponding MAC addresses are not shown for ARP entries.

Figure 10:
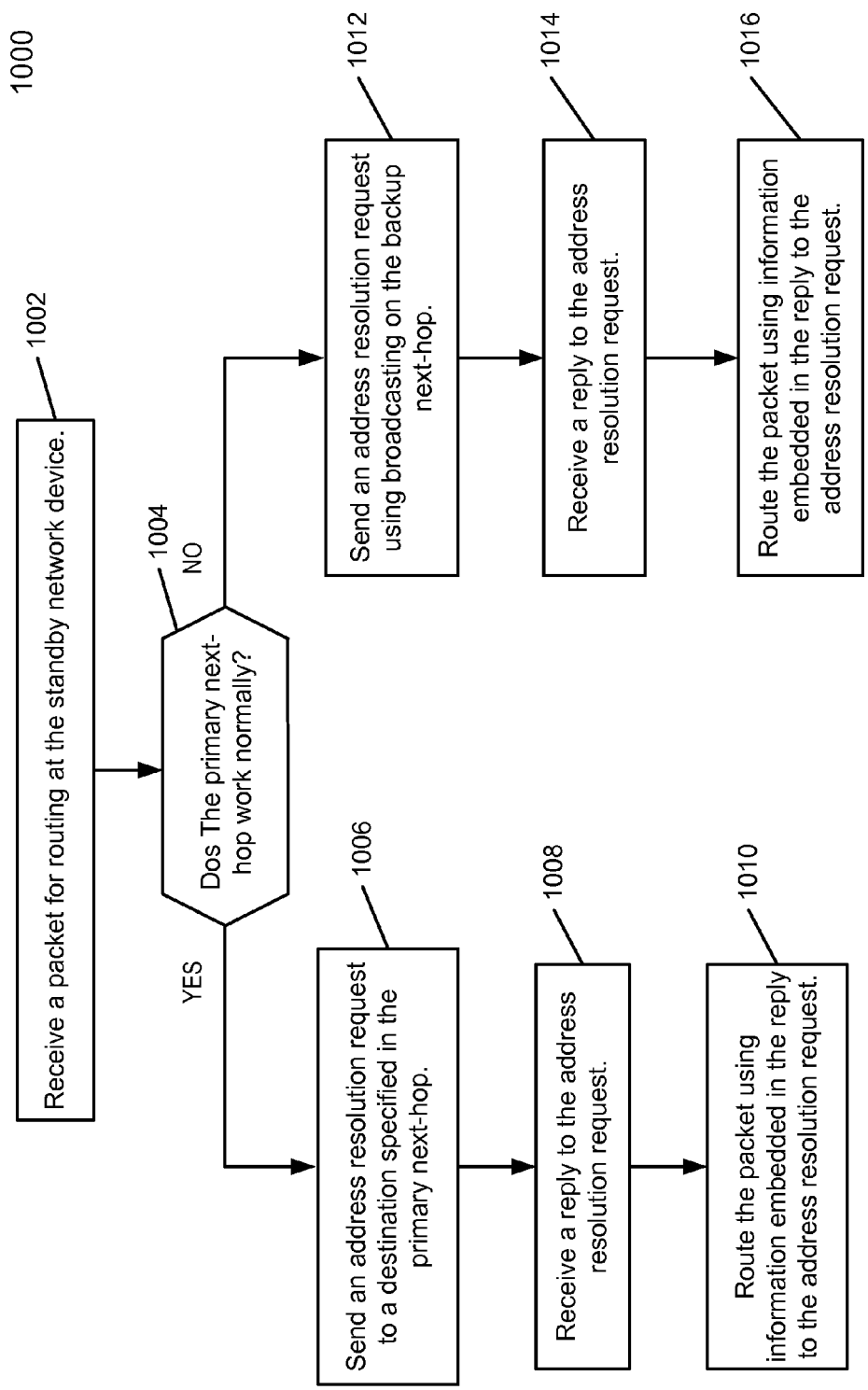
FIG. 10 is a flow diagram illustrating an address resolution process for a packet received at a standby network element of a multi-chassis link aggregation group according to one embodiment of the invention.

FIG. 10 is a flow diagram illustrating an address resolution process for a packet received at a standby network element of a multi-chassis link aggregation group (MC-LAG) according to one embodiment of the invention. FIG. 10 is a continuation of FIG. 7 in one embodiment, where the primary and backup next-hop interface addresses have been set on local and peer network elements. Since each network element of pairing network elements of a MC-LAG may be standby depending on traffic being transmitted, method 1000 may be implemented on some or all network elements of a MC-LAG.

At block 1002, a standby network element of a MC-LAG receives a packet for routing. The packet contains an unresolved MAC address requiring resolution. The standby network element first determines if the primary next-hop works properly at block 1004. If the primary next-hop works properly, the method goes to block 1006, where the standby network element sends an address resolution request using broadcasting on the primary next-hop. As disclosed in Table 2 above, the primary next-hop is set to be its peer network element, which is the active network element. The active network element will resolve the address resolution by broadcasting the address resolution request. Once the active network element obtains the address resolution, through local resolution or resolution through a neighbor network element, it sends the resolution to the standby network element. The standby network element receives a reply to the address resolution request from the active network element at block 1008, and it routes the packet using the information at block 1010.

If the primary next-hop does not work properly, the method goes to block 1012, where the standby network element sends an address resolution request using broadcasting on the backup next-hop. As disclosed in FIG. 8, the backup next-hop is set to be an IP address belonging to the MC-LAG. The remote network element will resolve the address resolution request if it can resolve the request, otherwise it forwards the broadcasted address resolution request. Once the remote network element obtains the address resolution, through local resolution or resolution through a neighbor network element, it sends the resolution to the standby network element. The standby network element receives a reply to the address resolution request from the active network element at block 1014, and it routes the packet using the information at block 1016.

Note the address resolution request is not implemented to a particular implementation of protocol. It can be an implementation of address resolution protocol (ARP) in IP version 4 (IPv4), an implementation of neighbor discovery (ND) in IP version 6 (IPv6), or other suitable protocols.

Figure 11:
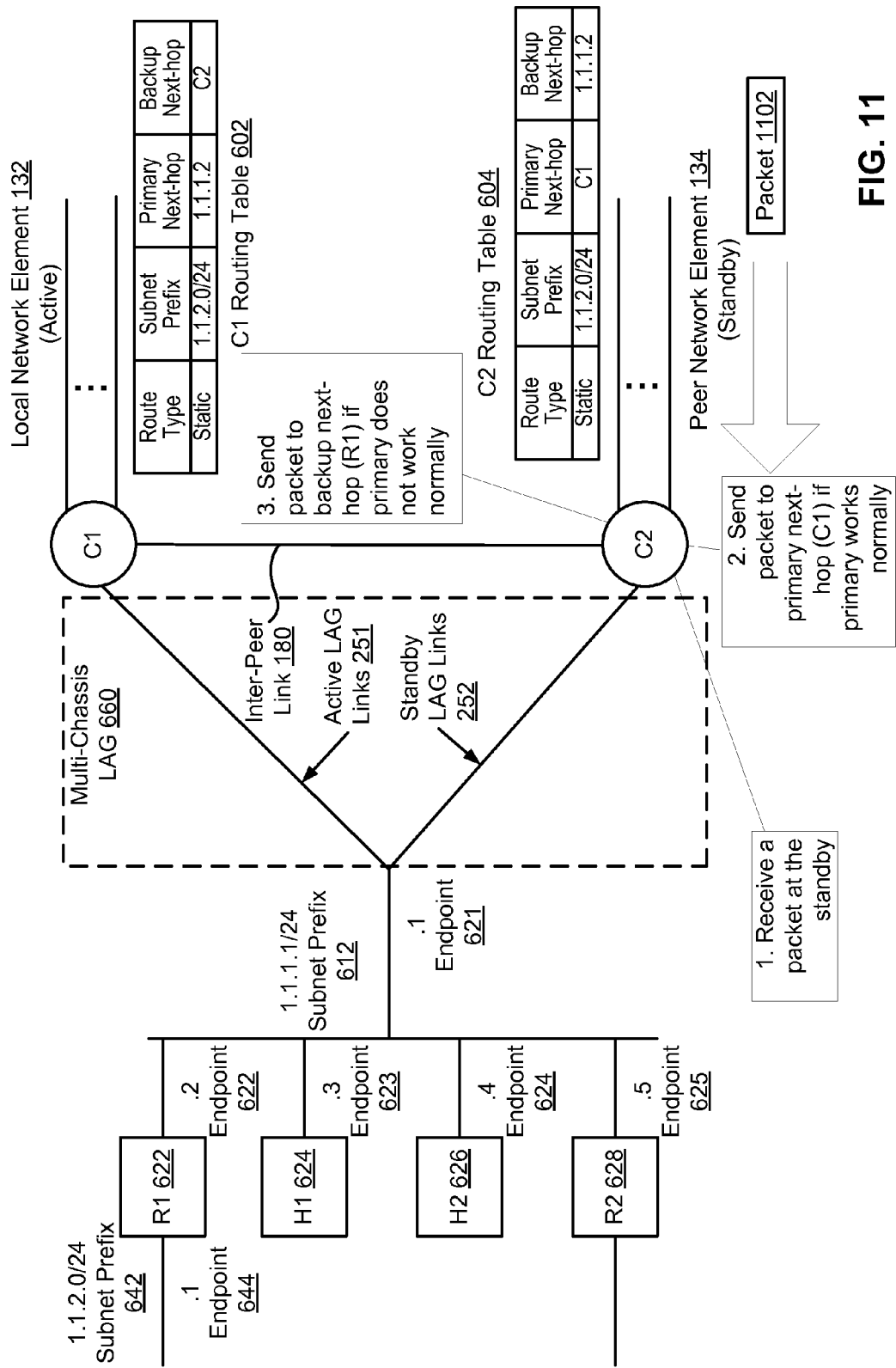
FIG. 11 illustrates static redundant next-hop settings of a multi-chassis link aggregation group according to one embodiment of the invention.

While routing may be done dynamically through setting interface IP addresses, routing may also be done through static setting. FIG. 11 illustrates static redundant next-hop settings of a multi-chassis link aggregation group according to one embodiment of the invention. FIG. 11 is similar to FIG. 6 and the same or similar references indicate elements or components having the same or similar functionalities.

Instead of the interface routes, which can be used for address resolution, here static routes are provisioned. At local network element 132 (C1), the primary next-hop is set to be an IP address of the neighbor network element R1, the secondary next-hop is set to be peer network element, and the subnet prefix is set to the subnet prefix of the neighbor network element R1. At peer network element 134 (C2), the primary next-hop is set to local network element C1, the backup next-hop is set to be the IP address of the neighbor network element R1, and the subnet prefix is set to be the same as C1. At task box 1, at the standby network element C2, packet 1102 is received. C2 sends the packet to primary next-hop C1 directly at task box 2 if the primary next-hop works normally. Otherwise, C2 sends the packet to secondary next-hop R1 if the primary next-hop does not work normally. While no dynamical routing is required, this setting may not be flexible enough to be utilized in scale in some scenarios.

Figure 12:
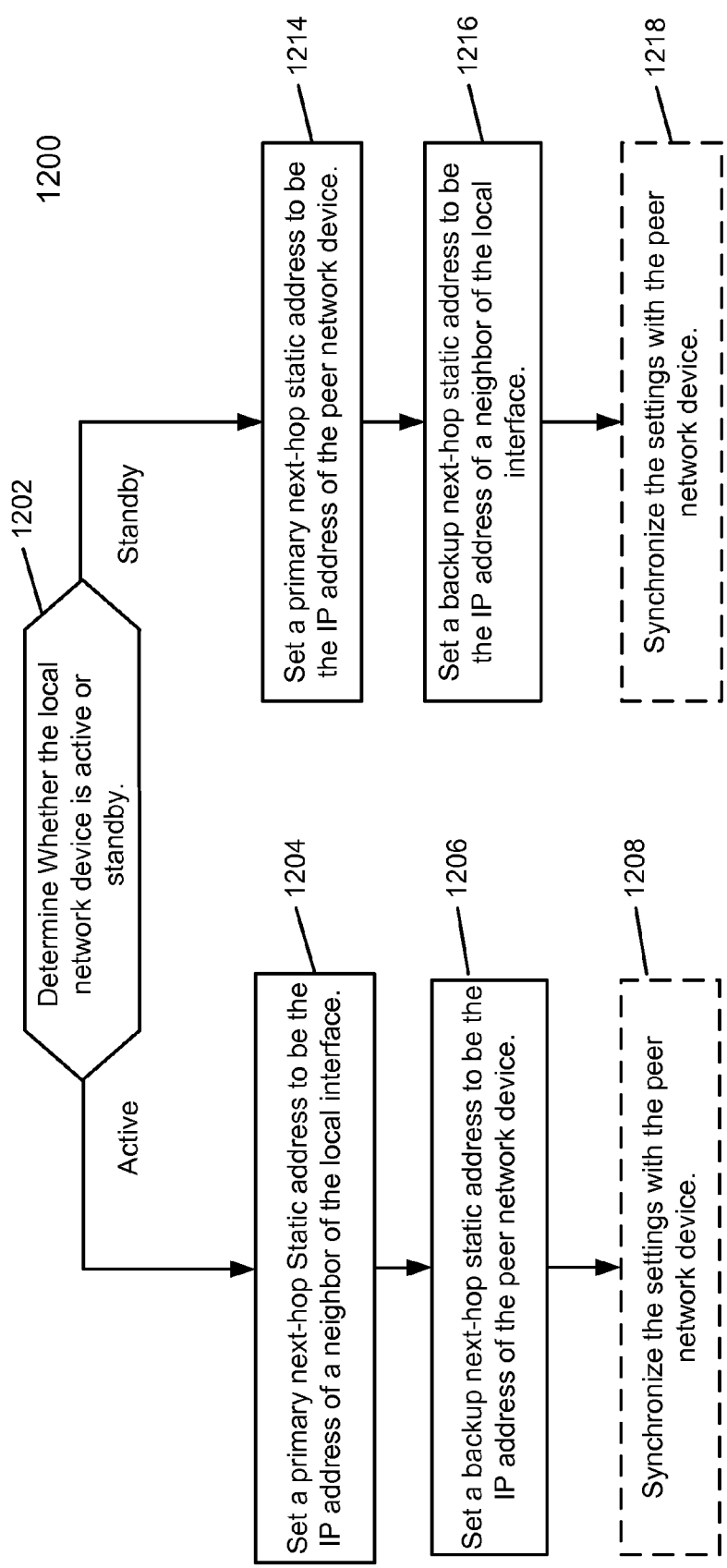
FIG. 12 is a flow diagram illustrating redundant next-hop settings of static routes of a multi-chassis link aggregation group according to one embodiment of the invention.

FIG. 12 is a flow diagram illustrating redundant next-hop settings of static routes of a multi-chassis link aggregation group according to one embodiment of the invention. Method 1200 may be implemented on a network element that is a part of a multi-chassis link aggregation group (MC-LAG) (e.g., local network element 132 in FIG. 11). The MC-LAG contains a local interface and a remote interface, and the local interface is a logical interface formed by a number of network elements including the network element (referred to as local network element) and one or more peer network elements. The remote interface is at a remote network element couple to the MC-LAG through links. The local network element communicates with a peer network element through an inter-peer link.

The method starts at block 1202, where it is determined whether the local network element is active or standby. The determination is made based on checking an aggregate state of the links coupled to the local network element being active or standby. As discussed herein above, the aggregate state of the links being active means a number of the coupled links are up and transmitting traffic of the MC-LAG, while the aggregate state of the links being standby means a number of the coupled links are up but not transmitting traffic of the MC-LAG.

When it is determined that the local network element is active, the method goes to block 1204, where the local network element sets a primary next-hop interface address of the local network element to bean IP address of a neighbor network element of the local interface of the MC-LAG. The neighbor network element is a network element coupled to the same subnet as the MC-LAG. Then at block 1206, the local network element sets a backup next-hop static address to be the IP address of the peer network element. In one embodiment, the settings of the primary and backup next-hop interface addresses, along with other parameters such as link aggregation state and IP subnet prefix, are synchronized with the settings of the peer network element through a protocol exchange with the peer network element at block 708. The synchronization is performed through a protocol exchange between the local network element and remote network element through an inter-peer link in one embodiment. The protocol exchange complies with an implementation of inter-chassis control protocol (ICCP) in one embodiment.

When it is determined that the local network element is standby, the method goes to block 1214. The local network element sets the primary next-hop static address to be the IP address of the peer network element at block 1214. Then at block 1216, the local network element sets the backup next-hop interface address of the local network element to be the IP address of a neighbor network element of the local interface of the MC-LAG. Similar to block 1208, in one embodiment, the settings of the primary and backup next-hop interface addresses, along with other parameters such as link aggregation state and IP subnet prefix, are synchronized with the settings of the peer network element through a protocol exchange with the peer network element at block 1218.

Network Elements Implementing Embodiments of the Invention

Figure 13:
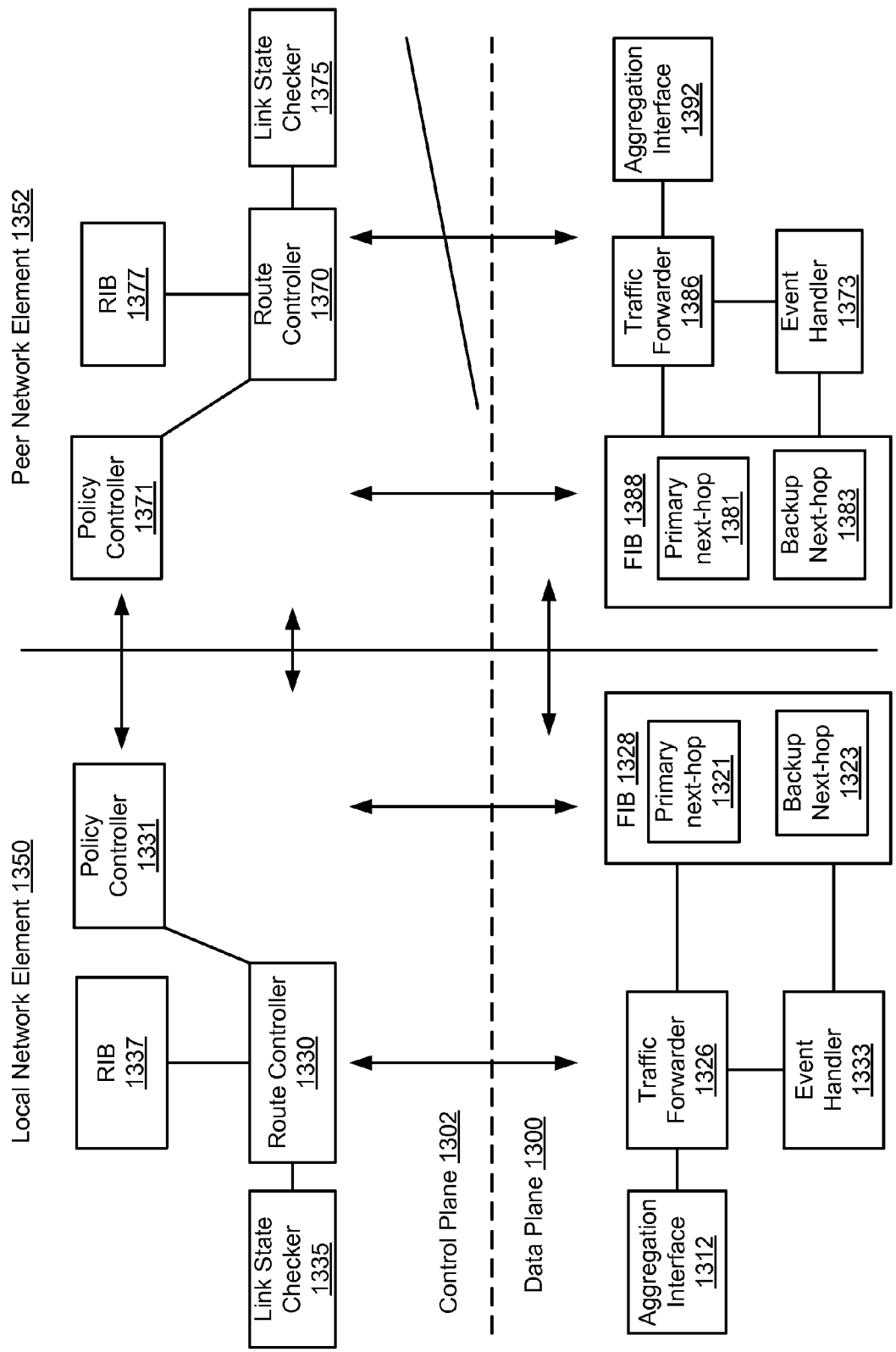
FIG. 13 illustrates logical components of one implementation of multiple network elements of a multi-chassis link aggregation group according to an embodiment of the invention.

Embodiments of the inventions may be implemented in a variety of ways. FIG. 13 illustrates logical components of one implementation of multiple network elements of a multi-chassis link aggregation group according to an embodiment of the invention. The various logical blocks may be implemented separately or integrated together with one or more other blocks to perform more or less described functions.

FIG. 13 illustrates local network element 1350 and peer network element 1352 side by side. The two network elements have the same logic components mirroring each other. The reason is that a network element being local or peer is based on the view of a given operation, and they do not differentiate from each other for routing and fault recovery operations. For simplicity of discussion, the discussion focuses on blocks of local network element 1350, and the corresponding blocks of peer network element 1352 perform the same or similar functions.

Functions of local network element 1350 are logically divided into blocks in control plane 1302 and data plane 1300. Control plane 1302 generally determines how packets are supposed to be routed, and data plane 1300 generally forwards the packets based on the determination. Note however, the functional separation between control plane and data plane differ significantly according to implementation and hardware availability, and while one separation is illustrated in FIG. 13, many other separations are feasible based on the principle disclosed herein.

Route controller 1330 is in control plane 1302. Route controller 1330 provides mechanisms enabling applications to add routes. Routes are stored in the Routing Information Base (RIB) at reference 1337. Selective routes are downloaded to the Forward Information Base (FIB) at reference 1328 at data plane 1300. Route controller 1330 provides capability to add redundant routes with fast re-route functionalities. Route controller 1330 provides information about primary and backup next-hop as well as information about switchover conditions for which data plane 1300 switches from a primary path to a backup path. Router controller 1330 also provides redundant interface routes and static routes based on provisions on subnet IP address of the MC-LAG and neighbor IP addresses learned, e.g., from ARP or ND, either locally or through a peer network element. Furthermore, router controller 1330 provides transparency to applications, enabling applications, unaware of the MC-LAG functionality, to add routes with the MC-LAG interface or neighbors as the next-hop, and automatically enable protection/redundancy for these routes.

Besides RIB 1337, router controller 1330 also interacts with link state checker 1335 and policy controller 1331 for route selection. Link state checker 1335 check and determines an aggregated state of links coupled to local network element 1350. Policy controller 1331 collects information about the MC-LAG from local and remote network elements of the MC-LAG and it determines policies to be used for routing over the MC-LAG. For example, policy controller 1331 determines a minimum number of links need to be up and carrying traffic of the MC-LAG for the links and local network element 1350 to be active.

Data plane 1300 includes FIB 1328, event handler 1333, aggregation interface 1312 and traffic forwarder 1326. FIB 1328 receives routing information passed from RIB 1337. Within FIB 1328, it contains primary next-hop 1321 and backup next-hop 1323 of the MC-LAG. These information associates subnet prefix of the MC-LAG in one embodiment.

Event handler 1333 performs functions generally associated with control plane, but it is advantageous to be placed in data plane to enable fast switchover capability. Event handler 1333 may be configured to perform functions including:

Detecting the failure of the MC-LAG in the local network element;

Detecting the failure of the MC-LAG in the peer network element;

Transmitting an notification of the failure of the MC-LAG;

Determining readiness of a peer network element to receive traffic of the MC-LAG through receipt of an activation confirmation from the peer network element, which is a result of the notification of the failure of the MC-LAG;

Switching traffic of the MC-LAG from the active links to the inter-peer link in response to receiving the activation confirmation from the peer network element.

Event handler 1333 propagates notification both within local network element 1350 and to peer network element for local events.

Aggregation interface 1312 is the aggregation ports of local network element 1350, the aggregation ports are coupled to links of the MC-LAG associated with local network element 1350. Traffic forwarder 1326 forwards packets received from aggregation interface 1312, the packet forwarding is based on information contained in FIB 1328 such as primary next-hop 1321 and backup next-hop 1323.

Figure 14:
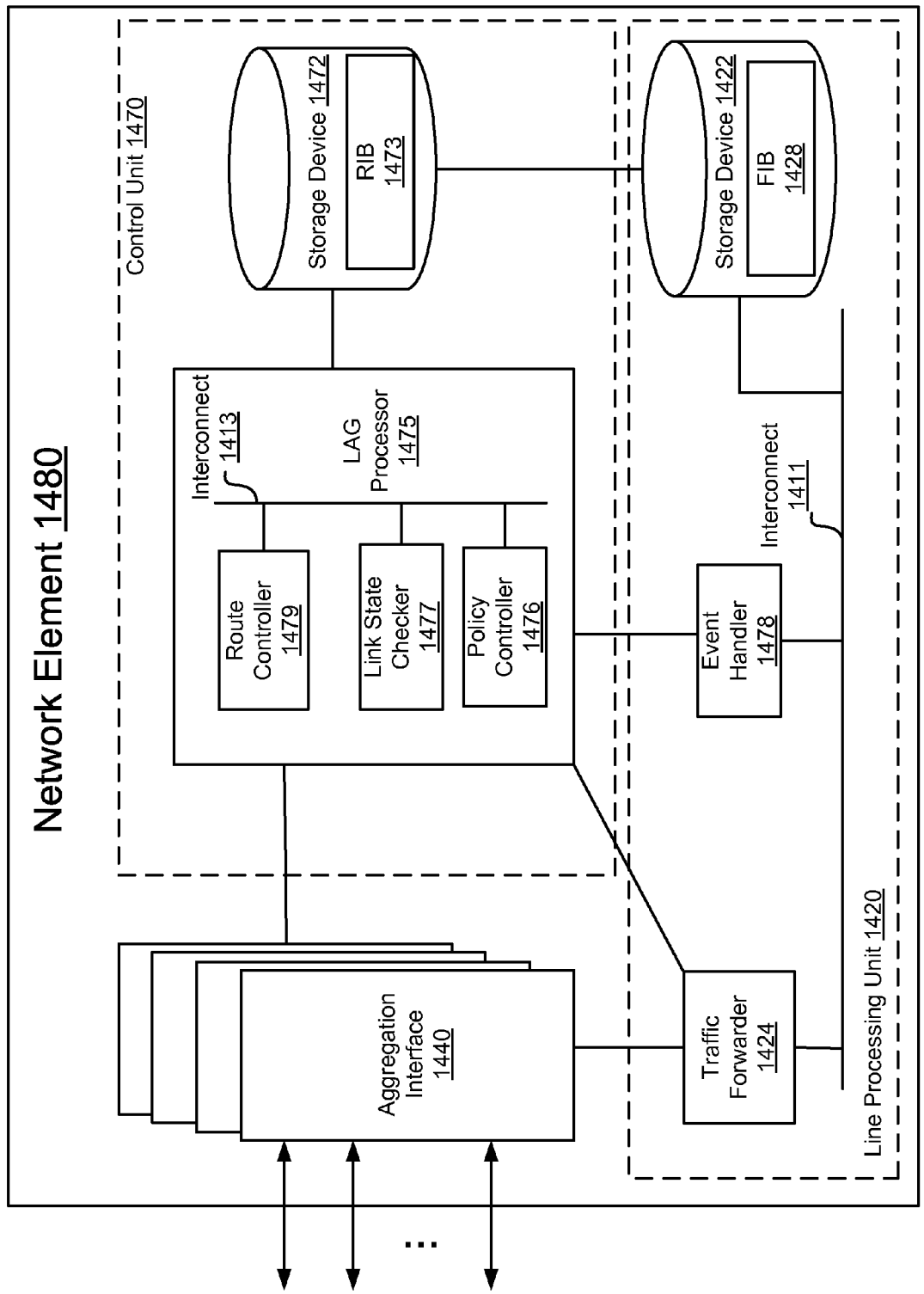
FIG. 14 illustrates a network element implementing coordinated switchover and redundant routes of a multi-chassis link aggregation group according to an embodiment of the invention.

FIG. 14 illustrates a network element implementing coordinated switchover and redundant routes of a multi-chassis link aggregation group according to an embodiment of the invention. Network element 1480 contains aggregation interface 1440, link aggregation group (LAG) processor 1475, traffic forwarder 1424, event handler 1478, and storage devices 1422 and 1472. LAG processor 1475 contains route controller 1479, link state checker 1477, and policy controller 1476, where the modules are coupled via interconnect 1413, which may be implemented as a bus. Storage devices 1422 and 1472 contain FIB 1428 and RIB 1473 respectively. FIG. 14 contains blocks illustrated in FIG. 13, and the same or similarly named blocks have the same or similar functionalities. The various blocks may be implemented separately or integrated together with one or more other blocks to perform more or less functions described herein.

Storage devices 1422 and 1472 within the network element 1480 can be any type of memory devices, caches, registers or similar storage devices for use as working memory and or persistent storage. Any number and variety of storage devices 1422 and 1472 can be utilized to store the data of the network element including programmed data and received data traffic to be processed by the network element 1480.

LAG processor 1475, along with storage device 1472 can be configured to perform the functions of control plane 1302 illustrated in FIG. 13. In one embodiment, LAG processor 1475 and storage device 1472 are a part of control unit 1470, which performs control and coordinating routing functions. In one embodiment, traffic forwarder 1424 and event handler 1478, and storage device 1422 are coupled via interconnect 1411, which may be implemented as a bus. These modules are parts of line processing unit 1420, which performs traffic forwarding function. Aggregation interface 1440 is the aggregation ports of network element 1480, and the aggregation ports are coupled to links of an MC-LAG associated with network element 1480.

In one embodiment, aggregation interface 1440 is configured to interact with links of the MC-LAG associated with network element 1480, and link state checker 1477 is configured to determine that network element 1480 is active by checking that an aggregate state of the links coupled to the network element 1480 is active. The aggregate state of the links being active indicates that a number of the links are up and transmitting traffic of the MC-LAG. Event handler 1478 is configured to send a notification to the peer network element when an anomaly is detected at the aggregation interface. Once an activation confirmation that a peer network element of network element 1480 is ready for switching, event handler 1478 switches traffic of the MC-LAG from the active links to an inter-peer link connecting network element 1480 and the peer network element in response to receiving the activation confirmation.

Note in one embodiment, link state checker is configured to further determine an aggregate state of links coupled to the peer network element, and the aggregate state of the links can further be standby or down, wherein the standby links are up but not transmitting traffic of the link aggregation group, and wherein down links do not carry traffic.

The detection of the anomaly of active links of the link aggregation group may be based on a threshold number of links of the active links malfunction, and the threshold number of links of the active links for detecting the anomaly may be configurable.

Also in one embodiment, policy controller 1476 is configured to place a policy to determine the aggregate state of the links coupled to the network element. In one embodiment, even handler 1478 is configured to forward the switched traffic based on matching an IP address prefix of one of a static route and a route learned dynamically through a protocol exchange.

In one embodiment, link state checker is configured to determine that network element 1480 is active or standby by checking that an aggregate state of the links coupled to network element 1480 is active or standby. The aggregate state of the links being active indicates that a number of the links are up and transmitting traffic of the MC-LAG, and the aggregate state of the links being standby indicates that a number of the links are up but not transmitting traffic of the MC-LAG. Router controller 1479 is configured to set a primary next-hop interface address of network element 1480 to be an IP address of the remote interface of the MC-LAG and to set a backup next-hop interface address of the network element to be an IP address of the peer network element in the FIB upon link state checker 1477 determines network element 1480 being active. Upon link state checker 1744 determines network element 1480 being standby, router controller 1479 is further configured to set the primary next-hop interface address of the network element to be IP address of the peer network element and set the backup next-hop interface address of network element 1480 to be the IP address of the remote interface of the MC-LAG.

Note Route controller 1479 may be further configured to set an IP subnet prefix for the local interface. In addition, route controller may be further configured to synchronize settings to the peer network element by a protocol exchange between the network element and the peer network element, the setting including at least one of the IP address settings, link aggregation states, and the IP subnet prefix.

In one embodiment, upon aggregation interface 1440 receives a packet and traffic forwarder 1424 does not know how to forward the packet. Route controller 1479 is configured to send an address resolution request to resolve an address for the packet, or alternatively the packet itself, to a destination specified by the primary next-hop interface address of network element 1480 upon determining that the primary next-hop specified by the primary next-hop interface address works properly. Route controller 1479 is further configured to receive a reply to the address resolution request, where the reply to the address resolution request helps traffic forwarder 1424 to forward the packet. In alternative, route controller 1479 is configured to send the address resolution request to a destination specified by the backup next-hop interface address of network element 1480 upon determining that the primary next-hop specified by the primary next-hop interface address does not work properly. Route controller 1479 is further configured to receive a reply to the address resolution request, where the reply to the address resolution request helps traffic forwarder 1424 to forward the packet. Note the address resolution request complies with one of an address resolution protocol (ARP) and a neighbor discovery (ND) protocol.

Figure 15:
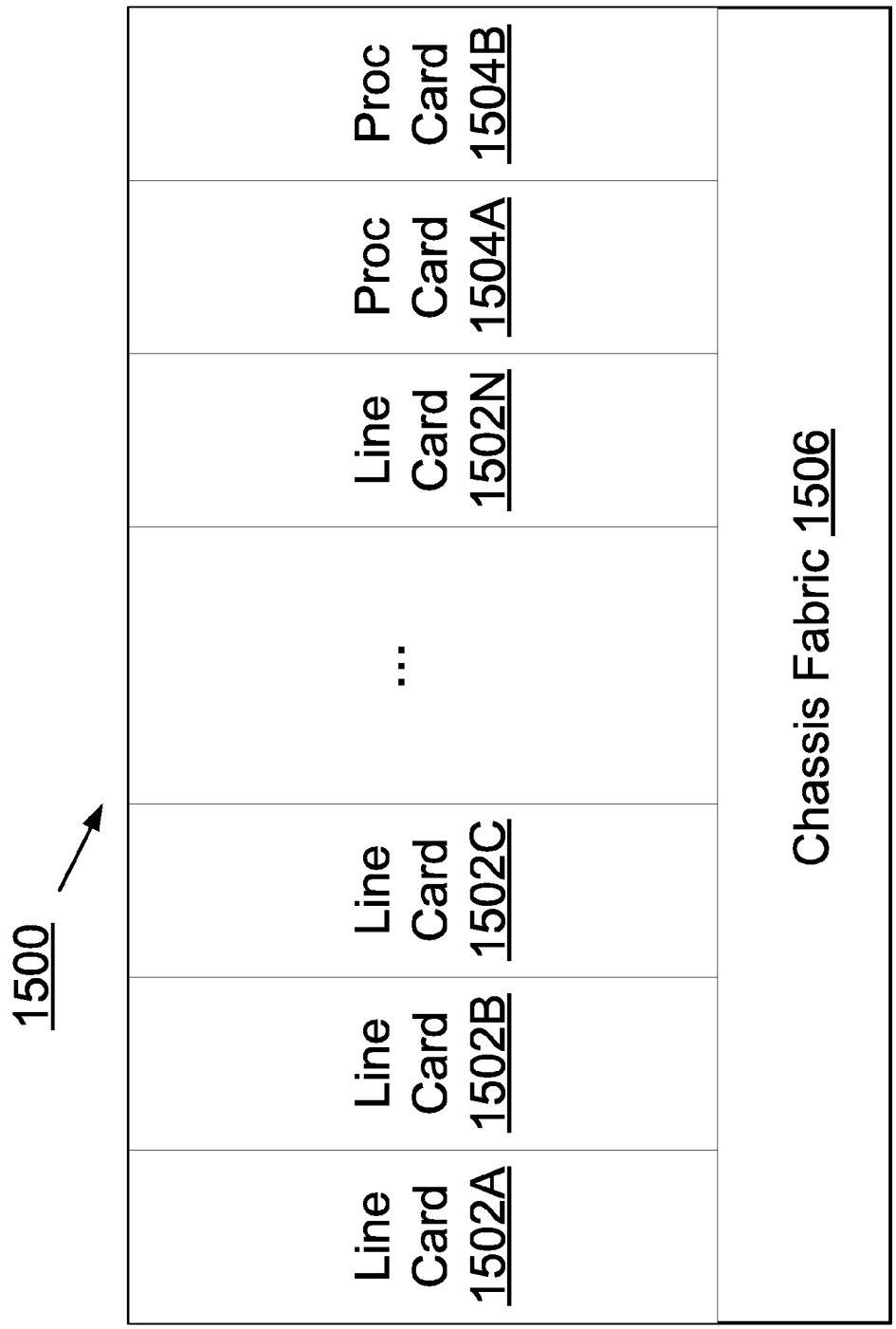
FIG. 15 is a block diagram illustrating a network element incorporating the method of coordinated switchover and redundant routing according to one embodiment of the invention.

FIG. 15 is a block diagram illustrating a network element incorporating the method of coordinated switchover and redundant routing according to one embodiment of the invention. Network element 1500 may contain embodiments of LAG processor 1475 of FIG. 14. While in one embodiment of the invention chassis fabric 1506 is coupled to line cards 1502A-N and processing cards 1504A-B, other embodiments of the invention describe multiple other devices and/or modules coupled to chassis fabric 1506. While in one embodiment, LAG processor 1475 of FIG. 14 may be part of line cards 1502A-N and/or processing cards 1504A-B, alternate embodiments may have alternate card arrangements (a combined line and processing card with one or more ports and a traffic forwarder, one processing card per line card, multiple processing cards per line card, etc.). Network element 1500 includes line cards 1502A-N to forward packets.

This implementation of LAG processor 1475 of FIG. 14 is an example, and not by way of limitation. Thus, network elements having other architectural configurations can incorporate embodiments of the invention. Examples of other network elements that could incorporate embodiments of the invention may have multiple line cards or have a single line card incorporating the functionality of both the forwarding and the controlling. Moreover, a network element having the forwarding functionality distributed across the traffic cards could incorporate embodiments of the invention.

The line cards 1502A-N and processor cards 1504A-B included in the different network elements and performing route controlling include memories, processors and/or Application Specific Integrated Circuits (ASICs). Such memory includes a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

While the invention has been described in terms of several example embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented for a link aggregation group, wherein the link aggregation group contains a local interface and a remote interface, wherein the local interface is a logical interface formed by a plurality of network elements, wherein the logical interface includes a local network element and a peer network element, wherein the remote interface is at a remote network element coupled to the link aggregation group through links of the link aggregation group, wherein the local network element communicates with the peer network element through an inter-peer link, and wherein the method implemented at the local network element, the method comprising:

determining that the local network element is active by checking that an aggregate state of the links coupled to the local network element is active, wherein the aggregate state of the links being active indicates that a number of the links are up and transmitting traffic of the link aggregation group;

detecting an anomaly of the active links of the link aggregation group;

sending a notification to the peer network element about the anomaly;

receiving an activation confirmation that the peer network element is ready for switching, wherein the activation confirmation is received from the peer network element, and wherein the peer network element has a same Internet Protocol (IP) address as the local network element; and switching traffic of the link aggregation group from the active links to the inter-peer link in response to receiving the activation confirmation.

2. The method of claim 1, wherein determining links coupled to the local network element being active further determines an aggregate state of links coupled to the peer network element.

3. The method of claim 1, wherein the aggregate state of the links can further be standby or down, wherein the standby links are up but not transmitting traffic of the link aggregation group, and wherein down links do not carry traffic.

4. The method of claim 1, wherein a policy is placed to determine the aggregate state of the links coupled to the local network element.

5. The method of claim 1, wherein the switched traffic is forwarded based on matching an IP address prefix of one of a static route and a route learned dynamically through a protocol exchange.

6. The method of claim 1, wherein the activation confirmation is sent by the peer network element, and the peer network element is caused to perform:

activating links of the link aggregation group coupled to the peer network element after receiving the notification about the anomaly; and sending the activation confirmation to the local network element after activation of the links of the link aggregation group completes.

7. The method of claim 1, wherein detecting the anomaly of the active links of the link aggregation group is based on a threshold number of links of the active links malfunctioning.

8. The method of claim 7, wherein the threshold number of links of the active links for detecting the anomaly is configurable.

9. The method of claim 1, wherein determining the local network element being active is performed through a protocol exchange with the peer network element of the link aggregation group.

10. The method of claim 9, wherein the protocol exchange complies with an implementation of an inter-chassis control protocol (ICCP), and wherein the protocol exchange is performed through the inter-peer link.

11. A method implemented for a link aggregation group, wherein the link aggregation group contains a local interface and a remote interface, wherein the local interface is a logical interface formed by a plurality of network elements, wherein the logical interface includes a local network element and a peer network element, wherein the remote interface is at a remote network element coupled to the link aggregation group through links of the link aggregation group, wherein the local network element communicates with the peer network element through an inter-peer link, and wherein the method implemented at the local network element, the method comprising:

determining that the local network element is active or standby by checking that an aggregate state of the links coupled to the local network element is active or standby, wherein the aggregate state of the links being active indicates that a number of the links are up and transmitting traffic of the link aggregation group, and wherein the aggregate state of the links being standby indicates that a number of the links are up but not transmitting traffic of the link aggregation group;

upon the local network element being active,
setting a primary next-hop interface address of the local network element to be an IP address belonging to a subnet of the link aggregation group; and
setting a backup next-hop interface address of the local network element to be an IP address of the peer network element, wherein the primary and backup next-hop interface addresses are used for resolving addresses for routing traffic; and upon the local network element being standby,
setting the primary next-hop interface address of the local network element to be IP address of the peer network element; and
setting the backup next-hop interface address of the local network element to be the IP address belonging to the subnet of the link aggregation group;

receiving a packet after the determination that the local network element is standby; and upon determining that the primary next-hop specified by the primary next-hop interface address works properly, sending an address resolution request to resolve an address for the packet to a destination specified by the primary next-hop interface address of the local network element;

receiving a reply to the address resolution request; and routing the packet and following packets addressed to the address using information embedded in the reply to the address resolution request.

12. The method of claim 11, wherein determining the local network element being active or standby further includes determining the peer network element being active or standby.

13. The method of claim 11, wherein the aggregate state of the links further includes down, wherein down links do not carry traffic, and wherein no setting of next-hop interface address at the network element coupled to the down links is performed.

14. The method of claim 11, wherein a policy is placed to determine the aggregate state of the links coupled to the local network element.

15. The method of claim 11, further comprising:
setting an IP subnet prefix for the local interface.

16. The method of claim 15, further comprising synchronizing settings to the peer network element by a protocol exchange between the local network element and the peer network element, the setting including at least one of:
the next-hop interface address settings;
link aggregation states; and
the IP subnet prefix.

17. The method of claim 16, wherein the local network element contains at least one of a routing information base (RIB) and forwarding information base (FIB), wherein the RIB contains routing information to aid the local network element to route traffic through an implementation of Internet Protocol (IP) using IP addresses, wherein the FIB contains forwarding information to aid the local network element to forward traffic at a faster speed than routing based on the RIB, wherein the protocol exchange passes information within at least one of the FIB and RIB associated with the local network element and the peer network element.

18. The method of claim 11, further comprising:
upon determining that the primary next-hop specified by the primary next-hop interface address does not work properly,
sending the address resolution request to a destination specified by the backup next-hop interface address of the local network element;
receiving a reply to the address resolution request; and
routing the packet and following packets addressed to the address using information embedded in the reply to the address resolution request.

19. The method of claim 11, wherein the address resolution request complies with one of an address resolution protocol (ARP) and a neighbor discovery (ND) protocol.

20. A network element communicatively coupled with aggregation ports through links of a link aggregation group, wherein the link aggregation group contains a local interface and a remote interface, wherein the local interface is a logical interface formed by a plurality of network elements, wherein the logical interface includes the network element and a peer network element, wherein the remote interface is at a remote network element coupled to the link aggregation group through links of the link aggregation group, wherein the network element communicates with the peer network element through an inter-peer link, the network element comprising:
an aggregation interface configured to interact with links of the link aggregation group and detect anomalies of the links; and
a link aggregation group processor, including:
a link state checker configured to determine that the network element is active by checking that an aggregate state of the links coupled to the network element is active, wherein the aggregate state of the links being active indicates that a number of the links are up and transmitting traffic of the link aggregation group;
an event handler configured to send a notification to the peer network element when an anomaly is detected at the aggregation interface;
the event handler further configured to receive an activation confirmation that the peer network element is ready for switching, wherein the activation confirmation is received from the peer network element, and wherein the peer network element has a same Internet Protocol (IP) address as the local network element; and
the event handler further configured to switch traffic of the link aggregation group from the active links to the inter-peer link in response to receiving the activation confirmation.

21. The network element of claim 20, wherein determining links coupled to the network element being active further determines an aggregate state of links coupled to the peer network element.

22. The network element of claim 20, wherein the aggregate state of the links can further be standby or down, wherein the standby links are up but not transmitting traffic of the link aggregation group, and wherein down links do not carry traffic.

23. The network element of claim 20, wherein the link aggregation group further comprises a policy controller configured to place a policy to determine the aggregate state of the links coupled to the network element.

24. The network element of claim 20, wherein the event handler is further configured to forward the switched traffic based on matching an IP address prefix of one of a static route and a route learned dynamically through a protocol exchange.

25. The network element of claim 20, wherein the activation confirmation is sent by the peer network element, and the peer network element is caused to perform:
activating links of the link aggregation group coupled to the peer network element after receiving the notification about the anomaly; and
sending the activation confirmation to the network element after activation of the links of the link aggregation group completes.

26. The network element of claim 20, wherein detecting the anomaly of the active links of the link aggregation group is based on a threshold number of links of the active links malfunctioning.

27. The network element of claim 26, wherein the threshold number of links of the active links for detecting the anomaly is configurable.

28. The network element of claim 20, wherein determining the network element being active is performed through a protocol exchange with the peer network element of the link aggregation group.

29. The network element of claim 28, wherein the protocol exchange complies with an implementation of an inter-chassis control protocol (ICCP), and wherein the protocol exchange is performed through the inter-peer link.

30. A network element communicatively coupled with aggregation ports through links of a link aggregation group, wherein the link aggregation group contains a local interface and a remote interface, wherein the local interface is a logical interface formed by a plurality of network elements, wherein the logical interface includes the network element and a peer network element, wherein the remote interface is at a remote network element coupled to the link aggregation group through links of the link aggregation group, wherein the network element communicates with the peer network element through an inter-peer link, the network element comprising:
an aggregation interface configured to receive a packet;
a storage device configured to store a forwarding information base (FIB), wherein the FIB contains forwarding information to aid the network element to forward traffic; and
a link aggregation group processor, including:
a link state checker configured to determine that the network element is active or standby by checking that an aggregate state of the links coupled to the network element is active or standby, wherein the aggregate state of the links being active indicates that a number of the links are up and transmitting traffic of the link aggregation group, and wherein the aggregate state of the links being standby indicates that a number of the links are up but not transmitting traffic of the link aggregation group; and
a route controller configured to set a primary next-hop interface address of the network element to be an IP address belonging to a subnet of the link aggregation group and to set a backup next-hop interface address of the network element to be an IP address of the peer network element in the FIB upon the link state checker determines the network element being active, and
the route controller further configured to set the primary next-hop interface address of the network element to be IP address of the peer network element and set the backup next-hop interface address of the network element to be the IP address belonging to the subnet of the link aggregation group in the FIB upon the link state checker determines that the network element being standby,
the route controller is further configured to send an address resolution request to resolve an address for the packet to a destination specified by the primary next-hop interface address of the network element upon determining that the primary next-hop specified by the primary next-hop interface address works properly, and
the route controller is further configured to receive a reply to the address resolution request, wherein the reply to the address resolution request helps traffic forwarder to forward the packet.

31. The network element of claim 30, wherein determining the network element being active or standby further includes determining the peer network element being active or standby.

32. The network element of claim 30, wherein the aggregate state of the links further includes down, wherein down links do not carry traffic, and wherein no setting of next-hop interface address at the network element coupled to the down links is performed.

33. The network element of claim 30, wherein the link aggregation group processor further comprises a policy controller, the policy controller being configured to determine the aggregate state of the links coupled to the network element.

34. The network element of claim 30, wherein the route controller is further configured to set an IP subnet prefix for the local interface.

35. The network element of claim 34, wherein the route controller is further configured to synchronize settings to the peer network element by a protocol exchange between the network element and the peer network element, the setting including at least one of:
the next-hop interface address settings;
link aggregation states; and
the IP subnet prefix.

36. The network element of claim 30, further comprising a storage device configured to store a routing information base (RIB), wherein the RIB contains routing information to aid the network element to route traffic through an implementation of Internet Protocol (IP) using IP addresses.

37. The network element of claim 30, further comprising:
the route controller is further configured to send the address resolution request to a destination specified by the backup next-hop interface address of the network element upon determining that the primary next-hop specified by the primary next-hop interface address does not work properly,
the route controller is further configured to receive a reply to the address resolution request, and
the route controller is further configured to receive a reply to the address resolution request, wherein the reply to the address resolution request helps traffic forwarder to forward the packet.

38. The network element of claim 30, wherein the address resolution request complies with one of an address resolution protocol (ARP) and a neighbor discovery (ND) protocol.

* * * * *